US012389461B1

(12) United States Patent
McClure

(10) Patent No.: US 12,389,461 B1
(45) Date of Patent: *Aug. 12, 2025

(54) PERFORMING RANDOM ACCESS PROCEDURE IN A WIRELESS COMMUNICATION SYSTEM

(71) Applicant: AerKodo, LLC, Midlothian, TX (US)

(72) Inventor: Kenneth McClure, Midlothian, TX (US)

(73) Assignee: AerKodo, LLC, Midlothian, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/197,575

(22) Filed: May 2, 2025

Related U.S. Application Data

(60) Provisional application No. 63/720,139, filed on Nov. 13, 2024.

(51) Int. Cl.
| | | |
|---|---|---|
| H04W 74/0836 | (2024.01) | |
| H04B 17/318 | (2015.01) | |
| H04W 36/08 | (2009.01) | |

(52) U.S. Cl.
CPC ...... H04W 74/0836 (2024.01); H04B 17/328 (2023.05); H04W 36/08 (2013.01)

(58) Field of Classification Search
CPC . H04W 36/08; H04W 36/10; H04W 36/0072; H04W 36/0055; H04W 36/0077;
(Continued)

(56) References Cited

U.S. PATENT DOCUMENTS

| 12,328,772 B1 | 6/2025 | McClure | |
|---|---|---|---|
| 2023/0232463 A1* | 7/2023 | Agiwal | H04W 72/23 370/329 |

(Continued)

FOREIGN PATENT DOCUMENTS

WO 2025034157 A1 2/2025

OTHER PUBLICATIONS

3GPP TS 38.321 V18.3.0 (Sep. 2024), 335 pages.
(Continued)

*Primary Examiner* — Peter Chen

(57) ABSTRACT

A method comprising initiating a random access (RA) procedure, by a reconfiguration with sync, for a bandwidth part (BWP), in circumstances where the reconfiguration with sync was not initiated for recovery using an lower-layer triggered mobility (LTM) candidate configuration, in circumstances where the BWP was configured with the dedicated contention free RA resources for the 4-step RA type, performing 4-step RA, in circumstances where the active BWP was not configured with the dedicated contention free RA resources for the 4-step RA type: in circumstances where the BWP was configured with the dedicated contention free RA resources for the 2-step RA type, performing 2-step RA, in circumstances where the BWP was not configured with the dedicated contention free RA resources for the 2-step RA type, performing 4-step RA; in circumstances where the reconfiguration with sync was initiated for recovery using an LTM candidate configuration: in circumstances where the BWP is configured with RA resources for 2-step RA type: in circumstances where the BWP is not configured with RA resources for 4-step RA type random access, performing 2-step RA, in circumstances where the BWP is configured with RA resources for 4-step RA type: in circumstances where the measured RSRP of the downlink pathloss reference is above the message-A threshold, performing 2-step RA, and in circumstances where the measured RSRP of the downlink pathloss reference is not above the message-A threshold, performing 4-step RA is disclosed.

20 Claims, 10 Drawing Sheets

(58) Field of Classification Search
CPC .......... H04W 74/0833; H04W 74/0836; H04B 17/318; H04B 17/327; H04B 17/328
See application file for complete search history.

(56) References Cited

U.S. PATENT DOCUMENTS

| | | |
|---|---|---|
| 2023/0388871 A1 | 11/2023 | Guo |
| 2024/0080903 A1* | 3/2024 | Agiwal ............. H04W 74/0833 |
| 2024/0163744 A1 | 5/2024 | Agiwal |
| 2025/0008391 A1 | 1/2025 | Kim |
| 2025/0106705 A1* | 3/2025 | Kim ..................... H04W 36/08 |

OTHER PUBLICATIONS

3GPP TS 38.331 V18.3.0 (Sep. 2024), 1,694 pages.
Non-Final Office Action received for U.S. Appl. No. 19/006,097, dated Mar. 6, 2025, 11 pages.
U.S. Appl. No. 19/197,605—specification, claims, and drawings, filed on May 2, 2025 (63 pages).

* cited by examiner

PERFORMING RANDOM ACCESS PROCEDURE IN A WIRELESS COMMUNICATION SYSTEM

TECHNICAL FIELD

The present application relates generally to performing a random access procedure.

BACKGROUND

As wireless systems have evolved, there have been an increasing number of scenarios where it is desirable for a user equipment (UE) to perform a random access (RA) procedure. However, many of the scenarios involving random access procedures have different requirements and priorities. In addition, there are various manners in which a random access can be performed, such as 2-step RA type procedure, a 4-step RA type procedure, a contention based RA procedure, a contention free RA procedure, etc. It is important for the UE to be able to select the correct type of RA procedure and the correct resources for the RA procedure based on the purpose that the RA procedure was initiated.

SUMMARY

Various aspects of examples of the invention are set out in the claims.

One or more embodiments may provide an apparatus, a computer readable medium, a non-transitory computer readable medium, a computer program product, and/or a method for initiating a random access (RA) procedure, by a reconfiguration with sync, for a bandwidth part (BWP), determining whether or not the reconfiguration with sync was initiated for recovery using a lower-layer triggered mobility (LTM) candidate, in circumstances where the reconfiguration with sync was not initiated for recovery using an LTM candidate configuration, determining whether or not the BWP was configured with dedicated contention free RA resources for a 4-step RA type, in circumstances where the BWP was configured with the dedicated contention free RA resources for the 4-step RA type, performing 4-step RA, in circumstances where the active BWP was not configured with the dedicated contention free RA resources for the 4-step RA type: determining whether or not the BWP was configured with dedicated contention free RA resources for a 2-step RA type, in circumstances where the BWP was configured with the dedicated contention free RA resources for the 2-step RA type, performing 2-step RA, in circumstances where the BWP was not configured with the dedicated contention free RA resources for the 2-step RA type, performing 4-step RA, in circumstances where the reconfiguration with sync was initiated for recovery using an LTM candidate configuration: determine whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, performing 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, and in circumstances where the measured RSRP of the downlink pathloss reference is not above the message-A threshold, performing 4-step RA.

In at least one example embodiment, the dedicated contention free RA resources are received in a rach-configDedicated information element.

In at least one example embodiment, determining whether or not the BWP is configured with RA resources for the 2-step RA type comprises determining whether or not the BWP is configured with common RA resources for 2-step RA type.

In at least one example embodiment, determining whether or not the BWP is configured with RA resources for the 4-step RA type comprises determining whether or not the BWP is configured with common RA resources for 4-step RA type.

In at least one example embodiment, circumstances where the reconfiguration with sync was initiated for recovery using an LTM candidate configuration include circumstances where a prior reconfiguration with sync failed and the UE is configured with a stored conditional RRC reconfiguration associated with the LTM candidate configuration.

In at least one example embodiment, performing 2-step RA comprises setting an RA type to be performed to 2-step RA type and performing the RA procedure based on the set RA type.

In at least one example embodiment, performing 2-step RA comprises selecting a RA resource set and performing the RA procedure based on the RA type designated by the selected RA resource set.

In at least one example embodiment, performing 4-step RA comprises setting an RA type to be performed to 4-step RA type and performing the RA procedure based on the set RA type.

In at least one example embodiment, performing 4-step RA comprises selecting a RA resource set and performing the RA procedure based on the RA type designated by the selected RA resource set.

One or more embodiments may provide an apparatus, a computer readable medium, a non-transitory computer readable medium, a computer program product, and/or a method for initiating a random access (RA) procedure for a bandwidth part (BWP), determining whether or not the RA procedure was initiated by a PDCCH order, in circumstances where the RA procedure was initiated by a PDCCH order, performing 4-step RA using RA resources indicated by the PDCCH order, in circumstances where the RA procedure was not initiated by a PDCCH order: determining that the RA procedure was initiated by a reconfiguration with sync, determining whether or not the reconfiguration with sync was initiated for recovery using a lower-layer triggered mobility (LTM) candidate, in circumstances where the reconfiguration with sync was not initiated for recovery using an LTM candidate configuration: determining whether or not the BWP was configured with dedicated contention free RA resources for a 4-step RA type, in circumstances where the BWP was configured with the dedicated contention free RA resources for the 4-step RA type, performing 4-step RA, in circumstances where the active BWP was not configured with the dedicated contention free RA resources for the 4-step RA type: determining whether or not the BWP was configured with dedicated contention free RA resources for a 2-step RA type, in circumstances where the BWP was configured with the dedicated contention free RA resources for the 2-step RA type, performing 2-step RA, in circumstances where the BWP was not configured with the dedicated contention free RA resources for the 2-step RA type, performing 4-step RA, in circumstances where the reconfiguration with sync was initiated for recovery using an LTM candidate configuration: determining whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, perform 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, and in circumstances where the measured RSRP of the downlink pathloss reference is not above the message-A threshold, performing 4-step RA.

In at least one example embodiment, the PDCCH order is a downlink control information (DCI).

In at least one example embodiment, the downlink control information is a DCI scrambled by a cell radio network temporary identifier (C-RNTI) and the DCI comprises a frequency domain resource assignment field having each bit set to a value of 1.

In at least one example embodiment, the scrambling of the DCI by the C-RNTI and the frequency domain assignment field having each bit set to the value of 1 signifies that the DCI is initiating the RA procedure by the PDCCH order.

In at least one example embodiment, the DCI comprises a cell indicator field.

In at least one example embodiment, the DCI is a DCI format 1_0.

In at least one example embodiment, in circumstances where the RA procedure was initiated by a PDCCH order, performing 4-step RA using RA resources indicated by the PDCCH order comprises: selecting a set of RA resources configured in an early uplink sync configuration that corresponds to a cell indicated by the cell indicator field, and performing 4-step RA comprises performing 4-step RA using the selected RA resources.

One or more embodiments may provide an apparatus, a computer readable medium, a non-transitory computer readable medium, a computer program product, and/or a method for initiating a random access (RA) procedure for a bandwidth part (BWP), determining whether or not the RA procedure was initiated by a reconfiguration with sync, in circumstances where the RA procedure was initiated by a reconfiguration with sync: determining whether or not the reconfiguration with sync was initiated for recovery using a lower-layer triggered mobility (LTM) candidate, in circumstances where the reconfiguration with sync was not initiated for recovery using an LTM candidate configuration: determining whether or not the BWP was configured with dedicated contention free RA resources for a 4-step RA type, in circumstances where the BWP was configured with the dedicated contention free RA resources for the 4-step RA type, performing 4-step RA, in circumstances where the active BWP was not configured with the dedicated contention free RA resources for the 4-step RA type: determining whether or not the BWP was configured with dedicated contention free RA resources for a 2-step RA type, in circumstances where the BWP was configured with the dedicated contention free RA resources for the 2-step RA type, performing 2-step RA, in circumstances where the BWP was not configured with the dedicated contention free RA resources for the 2-step RA type, performing 4-step RA, in circumstances where the reconfiguration with sync was initiated for recovery using an LTM candidate configuration: determining whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, performing 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, in circumstances where the measured RSRP of the downlink pathloss reference is not above the message-A threshold, performing 4-step RA, in circumstances where the RA procedure was not initiated by a reconfiguration with sync: determine that the RA procedure was initiated by an LTM cell switch medium access control (MAC) control element (CE), determining whether or not the LTM cell switch MAC CE indicates contention free random access resources, in circumstances where the LTM cell switch MAC CE indicates contention free random access resources, performing 4-step RA using the contention free resources indicated by the LTM cell switch MAC CE, in circumstances where the LTM cell switch MAC CE does not indicate contention free random access resources: determining whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, performing 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, and in circumstances where the measured RSRP of the downlink pathloss reference is not above the message-A threshold, performing 4-step RA.

One or more embodiments may provide an apparatus, a computer readable medium, a non-transitory computer readable medium, a computer program product, and/or a method for initiating a random access (RA) procedure for a bandwidth part (BWP), determining whether or not the RA procedure was initiated by a PDCCH order, in circumstances where the RA procedure was initiated by a PDCCH order, performing 4-step RA using RA resources indicated by the PDCCH order, in circumstances where the RA procedure was not initiated by a PDCCH order: determining whether or not the RA procedure was initiated by a reconfiguration with sync, in circumstances where the RA procedure was initiated by a reconfiguration with sync: determining whether or not the reconfiguration with sync was initiated for recovery using a lower-layer triggered mobility (LTM) candidate, in circumstances where the reconfiguration with sync was not initiated for recovery using an LTM candidate configuration: determining whether or not the BWP was configured with dedicated contention free RA resources for a 4-step RA type, in circumstances where the BWP was configured with the dedicated contention free RA resources for the 4-step RA type, performing 4-step RA, in circumstances where the active BWP was not configured with the dedicated contention free RA resources for the 4-step RA type: determining whether or not the BWP was configured with dedicated contention free RA resources for a 2-step RA type, in circumstances where the BWP was configured with the dedicated contention free RA resources for the 2-step RA type, performing 2-step RA, in circumstances where the BWP was not configured with the dedicated contention free RA resources for the 2-step RA type, performing 4-step RA, in circumstances where the reconfiguration with sync was initiated for recovery using an LTM candidate configuration: determining whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, performing 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, in circumstances where the measured RSRP of the downlink pathloss reference is not above the message-A threshold, performing 4-step RA, in circumstances where the RA procedure was not initiated by a reconfiguration with sync: determining that the RA procedure was initiated by an LTM cell switch medium access control (MAC) control element (CE), determining whether or not the LTM cell switch MAC CE indicates contention free random access resources, in circumstances where the LTM cell switch MAC CE indicates contention free random access resources, performing 4-step RA using the contention free resources indicated by the LTM cell switch MAC CE, in circumstances where the LTM cell switch MAC CE does not indicate contention free random access resources: determining whether or not the BWP is configured with RA resources for 2-step RA type, in circumstances where the BWP is configured with RA resources for 2-step RA type: determining whether or not the BWP is configured with RA resources for 4-step RA type, in circumstances where the BWP is not configured with RA resources for 4-step RA type random access, performing 2-step RA, in circumstances where the BWP is configured with RA resources for 4-step RA type: determining whether or not a measured reference signal received power (RSRP) of a downlink pathloss reference is above a message-A threshold, in circumstances where the measured RSRP of the downlink pathloss reference is above the message-A threshold, performing 2-step RA, and in circumstances where the measured RSRP of the downlink pathloss reference is not above the message-A threshold, performing 4-step RA.

BRIEF DESCRIPTION OF THE DRAWINGS

For a more complete understanding of embodiments of the invention, reference is now made to the following descriptions taken in connection with the accompanying drawings in which.

DETAILED DESCRIPTION

Figure 1:
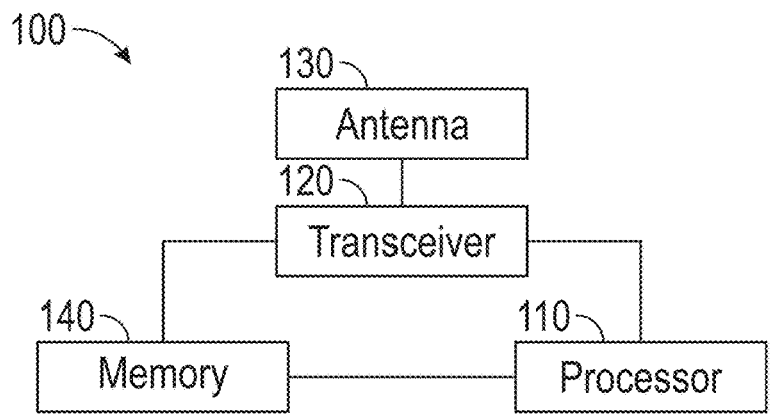
FIG. 1 is a block diagram illustrating an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 100, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 100 is illustrated and will be hereinafter described for purposes of example, other types of electronic apparatuses may readily employ embodiments of the invention. Electronic apparatus 100 may be a network node, such as a user equipment (UE) or a base station, and/or may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 100 comprises processor 110 and memory 140. Processor 110 may be any type of processor, controller, embedded controller, processor core, and/or the like. In at least one example embodiment, processor 110 utilizes computer program code to cause an apparatus to perform one or more actions. Memory 140 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 140 may store any of a number of pieces of information, and data. The information and data may be used by electronic apparatus 100 to implement one or more functions of the electronic apparatus 100, such as the functions described herein. In at least one example embodiment, memory 140 includes computer program code such that the memory and the computer program code are configured to, working with the processor, cause the apparatus to perform one or more actions described herein.

The electronic apparatus 100 may further comprise a transceiver 120. In at least one example embodiment, transceiver 120 is coupled with one or more antennae 130. In at least one example embodiment, processor 110 provides and/or receives signals to/from transceiver 120. The signals may comprise signaling information in accordance with a communications interface standard, user speech, received data, user generated data, and/or the like. Transceiver 120 may operate with one or more air interface standards, communication protocols, modulation types, and access types. By way of illustration, the electronic transceiver 120 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols such as LTE, fifth-generation (5G) protocols such as New Radio (NR) wireless networking protocols, such as 802.11, short-range wireless protocols, such as Bluetooth, and/or the like.

Processor 110 may comprise means, such as circuitry, for implementing audio, video, communication, navigation, logic functions, and/or the like, as well as for implementing embodiments of the invention including, for example, one or more of the functions described herein. For example, processor 110 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 100 among these devices according to their respective capabilities. The processor 110 thus may comprise the functionality to encode and interleave message and data prior to modulation and transmission. Processor 1 may additionally comprise an internal voice coder and may comprise an internal data modem. Further, the processor 110 may comprise functionality to operate one or more software programs, which may be stored in memory, and which may, among other things, cause the processor 110 to implement at least a portion of one embodiment including, for example, one or more of the functions described herein. For example, the processor 110 may operate a connectivity program, such as a conventional internet browser. The connectivity program may allow the electronic apparatus 100 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 100 may comprise a user interface for providing output and/or receiving input. The electronic apparatus 100 may comprise an output device, which may comprise an audio output device, such as a ringer, an earphone, a speaker, a tactile output device, such as a vibration transducer, an electronically deformable surface, an electronically deformable structure, a visual output device, such as a display and/or a light. The electronic apparatus may comprise an input device such as a light sensor, a proximity sensor, a microphone, a touch sensor, a force sensor, a button, a keypad, a motion sensor, a magnetic field sensor, a camera, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

Figure 2:
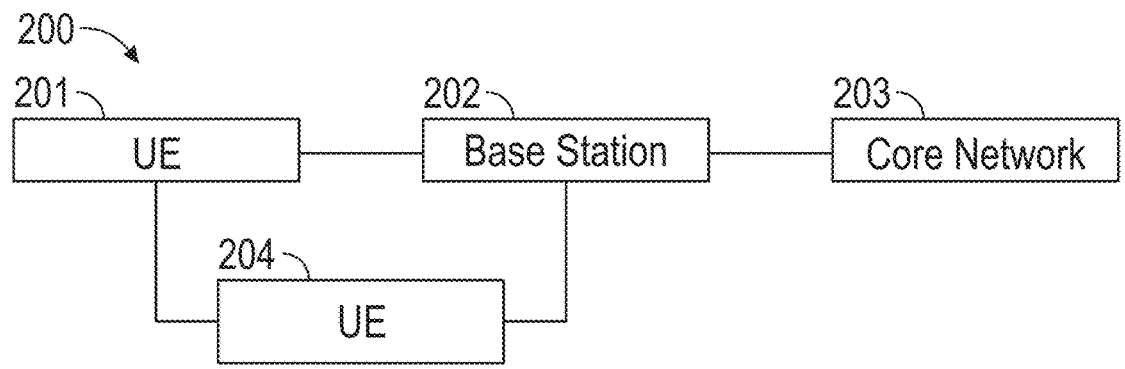
FIG. 2 is a block diagram illustrating a wireless communications system, according to at least one example embodiment.

FIG. 2 illustrates an example of a wireless communications system 200, according to at least one example embodiment. The wireless communications system 200 includes one or more base stations 202, a core network 203, and one or more user equipment (UE), such as UE 201 and/or UE 204. In some examples, the wireless communications system 200 may be a Long Term Evolution (LTE), LTE-Advanced (LTE-A) network, a New Radio (NR) network, etc. In some circumstances, wireless communications system 200 may support enhanced broadband communications, ultra-reliable (i.e., mission critical) communications, low latency communications, and communications with low-cost and low-complexity devices. To improve the reliability of some communications (e.g., ultra-reliable low latency communications (URLLC) packets), the wireless communications system 200 may be configured to generate and transmit duplicate packets. In such duplication systems, a transmitting device (e.g., base station 202, UE 201, or UE 204) may duplicate a packet. The original packet and duplicated packets may be transmitted to a receiving device (e.g., base station 202, UE 201, or UE 204). Transmitting multiple packets that include the same information may improve the likelihood that the receiving device receives the information included in the multiple packets.

One or more base stations 202 may wirelessly communicate with one or more UEs (e.g. UE 201 or UE 204) via one or more base station antennas. Each base station 202 may provide communication coverage for a respective geographic coverage area. Communication links in wireless communications system 200 may include uplink transmissions from a UE to a base station 202, or downlink transmissions, from a base station 202 to a UE. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

A plurality of UEs may be dispersed throughout the wireless communications system 200, and each UE may be stationary or mobile. A UE may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some circumstances, a UE may also be able to communicate directly with other UEs using sidelink communication (e.g., using a peer-to-peer (P2P) or device-to-device (D2D) protocol). For example, FIG. 2 provides an example of such communication between UE 201 and UE 204. One or more of a group of UEs utilizing sidelink communications may be within the coverage area of a cell. Other UEs in such a group may be outside the coverage area of a cell, or otherwise unable to receive transmissions from base station 202. In some circumstances, groups of UEs communicating via sidelink communications may utilize a one-to-many (1:M) system in which each UE transmits to every other UE in the group. In some circumstances, base station 202 facilitates the scheduling of resources for sidelink communications. In other circumstances, sidelink communications are carried out independent of base station 202.

In some circumstances, UE 204 may operate as a relay UE for UE 201. For example, instead of UE communicating directly with base station 202, UE 204 may be configured to operate as a relay such that UE 201 communicates to base station 202 via communication directly through UE 204. For example, UE 204 may operate as a Layer 2 (L2) UE to Network (U2N) relay.

Some UEs, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some circumstances, an MTC device may operate using half-duplex (one-way) communications at a reduced peak rate. MTC devices may also be configured to enter a power saving "deep sleep" mode when not engaging in active communications. In some circumstances, MTC or IoT devices may be designed to support mission critical functions and wireless communication systems may be configured to provide ultra-reliable communications for these functions.

Base station 202 may communicate with the core network 203 and with one or more other base stations. For example, base stations may interface with the core network 203 through come backhaul links (e.g., S1, etc.). Base stations may communicate with one another over other backhaul links (e.g., X2, etc.) either directly or indirectly (e.g., through core network 203). Base stations may perform radio configuration and scheduling for communication with UEs or may operate under the control of a base station controller (not shown). In some examples, base station 202 may be a macro cell, a small cell, a hot spot, and/or the like. Base stations may also be referred to as evolved NodeBs (NBs), such as eNBs, gNBs and/or the like.

Base station 202 may be connected by an S1 interface to core network 203. The core network may be an evolved packet core (EPC), which may include at least one mobility management entity (MME), at least one serving gateway (S-GW), and at least one Packet Data Network (PDN) gateway (P-GW). The MME may be the control node that processes the signaling between UE 201 and the EPC. All user Internet Protocol (IP) packets may be transferred through the S-GW, which itself may be connected to the P-GW. The P-GW may provide IP address allocation as well as other functions. The P-GW may be connected to the network operators IP services. The operator's IP services may include the Internet, the Intranet, an IP Multimedia Subsystem (IMS), and a Packet-Switched (PS) Streaming Service.

The core network 203 may provide user authentication, access authorization, tracking, IP connectivity, and other access, routing, or mobility functions. At least some of the network devices, such as base station 202 may include subcomponents such as an access network entity, which may be an example of an access node controller (ANC). Each access network entity may communicate with a number of UEs through a number of other access network transmission entities, each of which may be an example of a smart radio head, or a transmission/reception point (TRP). In some configurations, various functions of each access network entity or base station may be distributed across various network devices (e.g., radio heads and access network controllers) or consolidated into a single network device (e.g., base station 202).

Wireless communications system 200 may operate in an ultra-high frequency (UHF) frequency region using frequency bands from 700 MHz to 2600 MHZ (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some circumstances, wireless communications system 200 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some circumstances, this may facilitate the use of antenna arrays within UE 201 (e.g., for directional beamforming). However, EHF transmissions may be subject to even greater atmospheric attenuation and shorter range than UHF transmissions.

Thus, wireless communications system 200 may support millimeter wave (mmW) communications between UEs and base stations. Devices operating in mmW or EHF bands may have multiple antennas to allow beamforming. That is, base station 202 may use multiple antennas or antenna arrays to conduct beamforming operations for directional communications with UE 201. Beamforming (which may also be referred to as spatial filtering or directional transmission) is a signal processing technique that may be used at a transmitter (e.g., a base station) to shape and/or steer an overall antenna beam in the direction of a target receiver (e.g., a UE). This may be achieved by combining elements in an antenna array in such a way that transmitted signals at particular angles experience constructive interference while others experience destructive interference.

A cell can operate within a total channel bandwidth. In some circumstances, it may be desirable for the cell to have a construct that refers to a distinct portion of the total channel bandwidth, such as a bandwidth part (BWP). Such a structure allows for configuration information for the cell to be common within a BWP, and different across different BWPs. For example, it may be desirable for the cell to have 2 BWPs so that time-frequency resources are configured differently between the two BWPs. In addition, such a construct allows for a smooth transition between a configuration for a BWP and a configuration for a different BWP by merely indexing the correct BWP and referencing the configuration information for the indexed BWP. In this manner, each BWP may have its own configuration information for governing multiple aspects of communication, such as physical layer resources, MAC resources, RRC resources, etc.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 200 may use beamforming. For example, base station 202 may have an antenna array with a number of rows and columns of antenna ports that the base station may use for beamforming in its communication with UE 201. Signals may be transmitted multiple times in different directions (e.g., each transmission may be beamformed differently). A mmW receiver (e.g., a UE) may try multiple beams (e.g., antenna subarrays) while receiving the synchronization signals.

In some circumstances, the antennas of base station 202 or UE 201 may be located within one or more antenna arrays, which may support beamforming or MIMO operation. One or more base station antennas or antenna arrays may be collocated at an antenna assembly, such as an antenna tower. In some circumstances, antennas or antenna arrays associated with base station 202 may be located in diverse geographic locations. Base station 202 may use multiple antennas or antenna arrays to conduct beamforming operations for directional communications with UE 201.

In some circumstances, wireless communications system 200 may be a packet-based network that operates according to a layered protocol stack. In the user plane, communications at the bearer or PDCP layer may be IP-based. An RLC layer may in some circumstances perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between UE 201 and a network device or core network 203 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten one ms subframes numbered from zero to nine. A subframe may be further divided into two 0.5 ms slots, each of which contains six or seven modulation symbol periods (depending on the length of the cyclic prefix prepended to each symbol). Excluding the cyclic prefix, each symbol contains 2048 sample periods. In some circumstances, the subframe may be the smallest scheduling unit, also known as a TTI. In other circumstances, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 200 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. UE 201 may be configured with multiple downlink CCs and one or more uplink CCs for carrier aggregation. Carrier aggregation may be used with both frequency division duplexing (FDD) and time division duplexing (TDD) component carriers.

In some circumstances, wireless system 200 may utilize both licensed and unlicensed radio frequency spectrum bands. For example, wireless system 200 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base station 202 and UE 201 may employ listen-before-talk (LBT) procedures to ensure the channel is clear before transmitting data. In some circumstances, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 3:
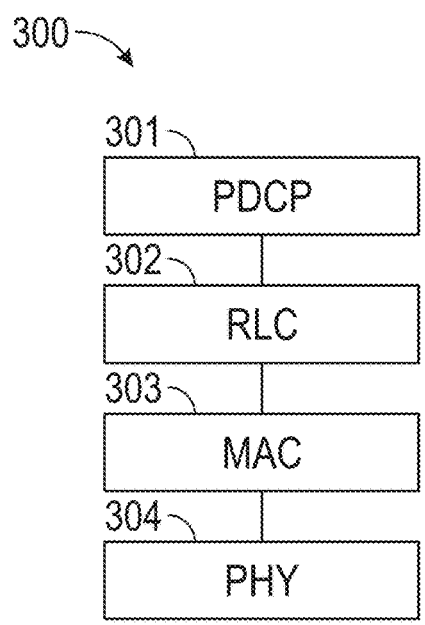
FIG. 3 is a diagram illustrating a protocol stack according to at least one example embodiment.

FIG. 3 is a diagram illustrating a protocol stack 300 according to at least one example embodiment. The example of FIG. 3 is merely an example and does not necessarily limit the scope of the claims.

In at least one example embodiment, physical (PHY) layer 304 provides an information transfer service to a higher layer using a physical channel. The PHY layer 304 may be connected to a medium access control (MAC) layer 303 located on the higher layer via a transport channel. Data may be transported between the MAC layer 303 and the PHY layer 304 via the transport channel. Data may be transported between a physical layer of a transmitting side and a physical layer of a receiving side via physical channels. The physical channels use time and frequency as radio resources. In some circumstances, the physical channel is modulated using an orthogonal frequency division multiple access (OFDMA) scheme in downlink and is modulated using a single carrier frequency division multiple access (SC-FDMA) scheme in uplink.

In at least one example embodiment, MAC layer 303 provides a service to a radio link control (RLC) layer 302 of a higher layer via a logical channel. The RLC layer 302 of the second layer supports reliable data transmission. A function of the RLC layer 302 may be implemented by a functional block of the MAC layer 303. A packet data convergence protocol (PDCP) layer 301 performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

In at least one example embodiment, the PDCP layer 301 is implemented by way of a PDCP entity that performs various actions of the PDCP layer. In this manner, an operating network node comprises one or more PDCP entities for performing PDCP layer activities. In operation, the PDCP entity receives data for transmission from higher layers in a PDCP service data unit (SDU). The PDCP entity performs various operations on the PDCP SDUs that it receives from higher layers for transmission, such as header compression, uplink data compression, integrity protection, ciphering, and/or the like. The PDCP entity performs these operations on a received PDCP SDU to generate a PDCP packet data unit (PDU) that is transmitted by way of the PDCP entity sending the PDCP SDU to lower layers for transmission.

In at least one example embodiment, the RLC layer 302 is implemented by way of a RLC entity that performs various actions of the RLC layer. In this manner, an operating network node comprises one or more RLC entities for performing RLC layer activities. In operation, the RLC entity receives data for transmission from higher layers in a RLC SDU. The RLC entity performs various operations on the RLC SDUs that it receives from higher layers for transmission, such as header compression, uplink data compression, integrity protection, ciphering, and/or the like. The RLC entity performs these operations on a received RLC SDU to generate a RLC PDU that is transmitted by way of the RLC entity sending the RLC SDU to lower layers for transmission.

In at least one example embodiment, the MAC layer 303 is implemented by way of a MAC entity that performs various actions of the MAC layer. In this manner, an operating network node comprises one or more MAC entities for performing MAC layer activities. In operation, the MAC entity receives data for transmission from higher layers in a MAC SDU. The MAC entity performs various operations on the MAC SDUs that it receives from higher layers for transmission, such as header compression, uplink data compression, integrity protection, ciphering, and/or the like. The MAC entity performs these operations on a received MAC SDU to generate a MAC PDU that is transmitted by way of the MAC entity sending the MAC SDU to lower layers for transmission.

In many circumstances, it may be desirable for the UE to initiate communication or synchronization with a base station using a random access procedure. The random access procedure can be used by the UE to initiate communication or synchronization for various purposes. The UE may use contention based random access or contention free random access. In at least one example embodiment, contention based random access refers to a random access procedure where the UE uses resources that are shared across multiple UEs, such that contention for the same resources may occur. In such circumstances, contention resolution may be part of the random access procedure. In at least one example embodiment, contention free random access refers to a random access procedure where the UE uses resources that are dedicated to the UE. In such circumstances, contention resolution may be avoided by the random access procedure. In at least one example embodiment, a random access resource refers to any resource that can be configurable for a UE for performing the random access procedure, such as one or more random access preambles, time-frequency resources for performing the random access procedure, etc.

In addition, there are two distinct types of random access procedure, the 4-step random access type and the 2-step random access type.

Figure 4A:
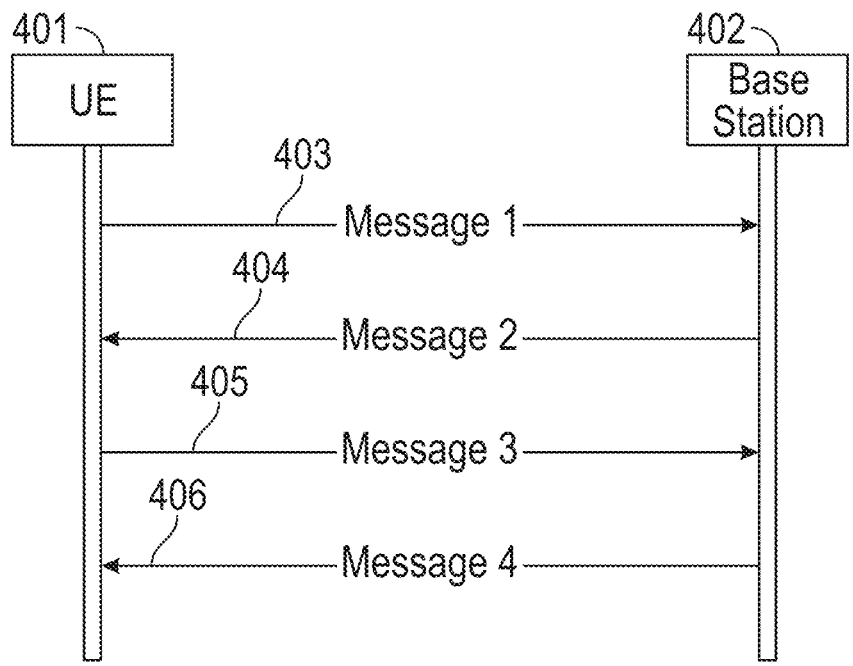
FIGS. 4A-4B are diagrams illustrating random access procedures according to at least one example embodiment.
Figure 4B:
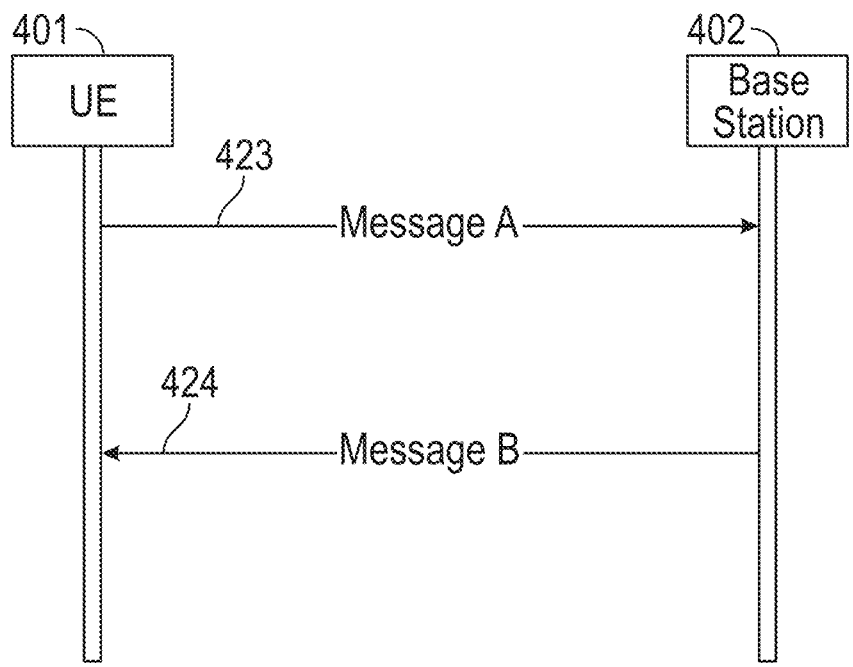

FIGS. 4A-4B are diagrams illustrating random access (RA) procedures according to at least one example embodiment. The examples of FIGS. 4A-4B are merely examples and do not necessarily limit the scope of the claims.

FIG. 4A is a diagram illustrating a 4-step random access procedure between UE 401 and base station 402 according to at least one example embodiment.

At communication 403, UE 401 sends a message-1 to the base station. In at least one example embodiment, the message-1 is a random access request. In at least one example embodiment, the message-1 comprises a random access preamble. In at least one example embodiment, the message-1 is sent on a random access channel (RACH) using random access resources.

At communication 404, the UE receives a message-2 from base station 402. In at least one example embodiment, the message-2 is a random access response. In at least one example embodiment, the random access response indicates resources for the UE to use for the message-3 transmission.

At communication 405, UE sends the message-3 to base station 402 using the resources indicated by the message-2. The message-3 may be referred to as the data transmission. In at least one example embodiment, the message-3 is a physical uplink shared channel (PUSCH) transmission that uses PUSCH resources indicated by the message-2.

At communication 406, the UE receives a message-4, if necessary. In at least one example embodiment, the message-4 is a contention resolution message. In such circumstances, it may be desirable for the UE to perform a 2-step random access procedure.

In some circumstances, it may be desirable for the UE to perform the random access procedure with a reduced latency from the latency of the 4-step random access procedure.

FIG. 4B is a diagram illustrating a 2-step random access procedure between UE 401 and base station 402 according to at least one example embodiment.

At communication 423, UE 401 sends a message-A to base station 402. In at least one example embodiment, the message-A includes the random access request and the data transmission. In at least one example embodiment, the message-A includes the RA preamble transmitted on the RACH and the data transmission on the PUSCH.

At communication 424, UE 401 receives a message-B from base station 402. In at least one example embodiment, the message-B includes the random access response and any necessary contention resolution message.

Even though the 2-step RA procedure can reduce latency, it may be more reliable to initiate the 4-step RA procedure. Therefore, depending upon the circumstances, sometimes 2-step RA type may be preferable over 4-step RA type, and at other times 4-step RA type may be preferable over 2-step RA type. For example, it may be desirable, in some circumstances, to measure a reference signal received power (RSRP) for a downlink pathloss reference to determine whether or not to initiate 2-step RA type. In some circumstances, it may be desirable to condition the performance of the 2-step RA type procedure on the measured RSSP for the downlink pathloss reference being greater than a configured message-A threshold. In at least one example embodiment, the UE measures RSRP for a downlink pathloss reference. In at least one example embodiment, the UE determines whether or not a measured reference signal received power (RSRP) of a downlink pathloss reference is above a message-A threshold. In at least one example embodiment, in circumstances where the measured RSRP of the downlink pathloss reference is above the message-A threshold, the UE performs 2-step RA. In at least one example embodiment, in circumstances where the measured RSRP of the downlink pathloss reference is not above the message-A threshold, the UE performs 4-step RA.

In at least one example embodiment, the UE receives configuration information for performing the RA procedure. In at least one example embodiment, the UE receives BWP configuration information that includes configuration information for performing the RA procedure. In this manner, the configuration information for the RA procedure may be specific to a particular BWP. For example, the UE may receive BWP uplink configuration information that includes RA configuration information.

In at least one example embodiment, the BWP is configured with common RA resources and/or dedicated RA resources. In at least one example embodiment, the term common RA resources refers to resources that the UE may share with other UEs. For example, the UE may receive BWP configuration that includes configuration of RA resource in a common configuration information element, such as a RACH common configuration information element, a RACH 2-step RA common configuration element, and/or the like. Common RA resources may also be referred to as contention based RA (CBRA) resources. In at least one example embodiment, the term dedicated RA resources refers to resources that are specifically assigned to the UE. For example, the UE may receive BWP configuration that includes configuration of RA resource in a dedicated configuration information element, such as a RACH dedicated configuration information element (ex. a rach-configDedicated information element). Dedicated RA resources may also be referred to as contention free RA (CFRA) resources, dedicated contention free RA resources, and/or the like. In at least one example embodiment, the term RA resources, absent any other qualifying term refers to dedicated RA resources and/or common RA resources.

In at least one example embodiment, 2-step RA resources are distinctly configured from 4-step RA resources. The term 2-step RA resources may refer to RA resources for performing 2-step RA type. In at least one example embodiment, an information element used for configuring 2-step RA resources is different from an information element used for configuring 2-step RA resources, due to the differences in the relevant parameters for each of the configurations. For example, dedicated 4-step RA resources may be included in a CFRA information element and dedicated 2-step RA resources may be included in a 2-step SFRA information element. In another example, common 4-step RA resources may be included in a common RACH configuration information element and common 2-step RA resources may be included in a common RACH 2-step configuration information element. In at least one example embodiment, the terms 4-step RA resources and RA resources for 4-step RA type, absent any other qualifying term refers to dedicated 4-step RA resources and/or common 4-step RA resources. In at least one example embodiment, the terms 2-step RA resources and RA resources for 2-step RA type, absent any other qualifying term refers to dedicated 2-step RA resources and/or common 2-step RA resources.

In at least one example embodiment, RA resource configuration information includes parameters that specify specific resources as well and parameters that govern the use of such resources. For example, RA resources configuration information may include parameters that specify time-frequency resources, RA preambles, and/or the like. In addition, 2-step RA resource configuration information may include threshold information, such as a message-A threshold.

There are many reasons for initiating a random access procedure. For example, it may be desirable to perform an RA procedure for handover, for the UE initiating a data communication, based on a directive from the base station, or as part of a reconfiguration. In at least one example embodiment, a reconfiguration refers to an RRC reconfiguration procedure that is used for establishing a radio connection between the UE and the base station. In some circumstances, it may be desirable for the UE to perform a reconfiguration with synchronization (also referred to as a reconfiguration with sync). For example, a reconfiguration with sync may be useful for handover, for handling a RRC reconfiguration failure, for radio link failure recovery, and/or the like. In at least one example embodiment, the UE performs an RA procedure as part of a reconfiguration with sync. In at least one example embodiment a RA procedure is initiated by a reconfiguration with sync. In such an example, the UE initiates the RA procedure in order to complete the reconfigure with sync procedure.

The reconfiguration with sync may be initiated by the base station or may be initiated by the UE. In at least one example embodiment, the UE receives an RRC reconfiguration message that includes a directive for performing a reconfiguration with sync. In this manner, the reconfiguration with sync was initiated by the base station, and the UE performs the reconfiguration with sync in response to receiving the RRC message. In some circumstances, it may be desirable for the UE to have configuration information stored on the UE to be used in certain circumstances for RRC reconfiguration. For example, it may be desirable for the UE to use such configuration information to perform a reconfiguration with sync in circumstances when an RRC reconfiguration has failed, a radio link has failed, and/or the like. In at least one example embodiment, the UE receives conditional RRC reconfiguration information and stores the conditional RRC reconfiguration. In at least one example embodiment, the UE performs a reconfiguration with sync using stored conditional RRC reconfiguration in circumstances where a prior reconfiguration with sync has failed. In at least one example embodiment, the conditional RRC reconfiguration includes a cell candidate configuration for the reconfiguration. In at least one example embodiment, the UE initiates a reconfiguration with sync for recovery using a cell candidate configuration in circumstances where a prior reconfiguration with sync failed and the UE is configured with a stored conditional RRC reconfiguration associated with the cell candidate configuration.

Lower-layer triggered mobility (LTM) enables reconfiguration using lower layer signaling, while keeping configuration of the upper layers. In some circumstances LTM is desirable to reduce the latency and signaling overhead during the reconfiguration. During the LTM, user plane may be continued whenever possible, without reset, with the candidate cell to avoid data loss and the additional delay of data recovery. Further, security updating may be avoided in LTM. In at least one example embodiment, LTM is used for performing a reconfiguration with sync. In at least one example embodiment, a cell candidate may indicate that the cell candidate supports LTM. In at least one example embodiment, an LTM candidate refers to a cell candidate that is configured for LTM. In at least one example embodiment, the UE initiates a reconfiguration with sync for recovery using a lower-layer triggered mobility (LTM) candidate. In such an example, the RA procedure is initiated by the reconfiguration with sync using the LTM candidate.

The UE may have numerous RA resources configured for a BWP. When an RA procedure is initiated, the UE must determine which RA type to be performed based on the RA resources that are configured for the BWP and the purpose of the RA procedure. In at least one example embodiment, the UE performs an RA procedure of a particular RA type based on the RA resources configured for the BWP and based on the manner in which the RA procedure was initiated.

In some circumstances, depending upon the cause of initiation of the RA procedure, it may be desirable to prefer dedicated RA resources over common RA resources, to prefer common RA resources over dedicated RA resources, to prefer 4-step RA type over 2-step RA type, to prefer 2-step RA type over 4-step RA type, and/or the like. For example, it may be desirable to avoid the long latency associated with contention resolution for RA procedures initiated by a reconfiguration with sync by preferring dedicated RA resources over common RA resources in circumstances where the RA procedure is initiated by the reconfiguration with sync. In addition, in circumstances where the RA procedure is initiated by the reconfiguration with sync using dedicated RA resources, it may be desirable to prioritize reliability by preferring 4-step RA type over 2-step RA type. Conversely, in circumstances where the RA procedure is initiated by the reconfiguration with sync using common RA resources, it may be desirable to prioritize reducing overhead and latency by preferring 2-step RA type over 4-step RA type.

However, it may be desirable to use a different prioritization in circumstances where the reconfiguration with sync was initiated for recovery using an LTM candidate configuration. For example, in such circumstances, it may be desirable to avoid using dedicated RA resources instead of prioritizing them. Therefore, the determination of which RA type procedure to perform must consider, not only whether the RA procedure was initiated by a reconfiguration with sync, but also must consider whether or not the reconfiguration with sync was initiated for recovery using an LTM candidate configuration when determining which RA type procedure to perform.

After the UE applies the appropriate prioritization based on the manner in which the RA procedure was initiated, there are several ways in which the UE may perform the appropriate RA type procedure.

For example, each set of RA resources may have a distinct RA resource set identifier that uniquely designates an RA resource set for a BWP. In such circumstances, it may be desirable to perform the RA type procedure by selecting the RA resource set identifier based on the RA configuration information and the manner in which the RA procedure was initiated, then use the RA-type associated with the RA resource set identifier for determining which RA-type procedure to perform. This type of solution necessarily requires an RA resource set identifier. In such circumstances, there may also need to be a unified RA resource set structure that is capable of including the parameters for each different type of RA resources, such as dedicated RA resources, common RA resources, 2-step RA type resources, 4-step RA type resources, and/or the like. In this manner, each RA resource set can be generally indexed by a RA resource set identifier, which can be used for selecting and designating an RA resource set for use in the RA procedure.

In another example, the UE may set an RA-type for the RA procedure based on the RA configuration information and the manner in which the RA procedure was initiated, then use the set RA-type for determining which RA-type procedure to perform. This type of operation may be desirable in circumstances where there is no RA resource set identifier. For example, based on the lack of an RA resource set identifier, it may be desirable to perform determination of the applicable RA resource set each time a specific parameter is needed. This type of solution may be necessary when there is no specified RA resource set identifier, or when there are multiple different information elements that specify the available RA resource sets for a BWP.

Figure 5A:
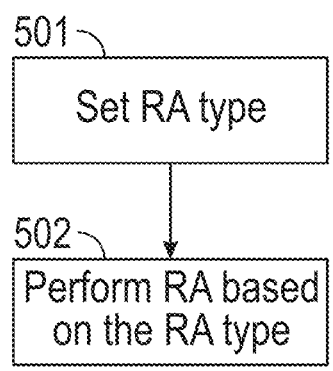
FIGS. 5A-5B are flow diagrams illustrating activities associated with performing random access according to at least one example embodiment.

FIG. 5A is a flow diagram illustrating activities associated with performing random access according to at least one example embodiment. In at least one example embodiment, there is a set of operations that corresponds with the activities of FIG. 5A. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 5A.

At block 501, the apparatus sets the RA type. For example, the setting of the RA type may be based on the RA configuration information for the BWP and the manner in which the RA procedure was initiated.

At block 502, the apparatus performs the RA procedure based on the set RA type. For example, if the set RA type is 4-step RA type, the UE performs the 4-step RA procedure. In another example, if the set RA type is 2-step RA type, the UE performs the 2-step RA procedure.

Figure 5B:
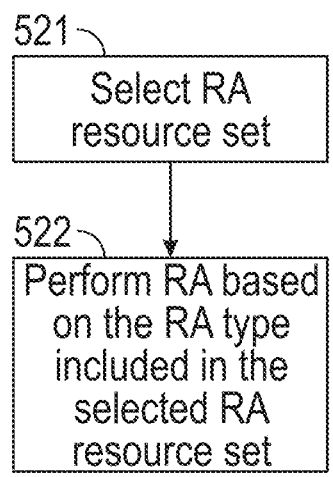

FIG. 5B is a flow diagram illustrating activities associated with performing random access according to at least one example embodiment. In at least one example embodiment, there is a set of operations that corresponds with the activities of FIG. 5B. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 5B.

At block 521, the apparatus selects an RA resource set. For example, the selection of the RA resource set may be based on the RA configuration information for the BWP and the manner in which the RA procedure was initiated.

At block 522, the apparatus performs the RA procedure based on the RA type included in the selected RA resource set. For example, if the selected RA resource set indicates that the RA resources apply to the 2-step RA type, the UE performs the 2-step RA procedure. In another example, if the selected RA resource set indicates that the RA resources apply to the 4-step RA type, the UE performs the 4-step RA procedure.

Figure 6:
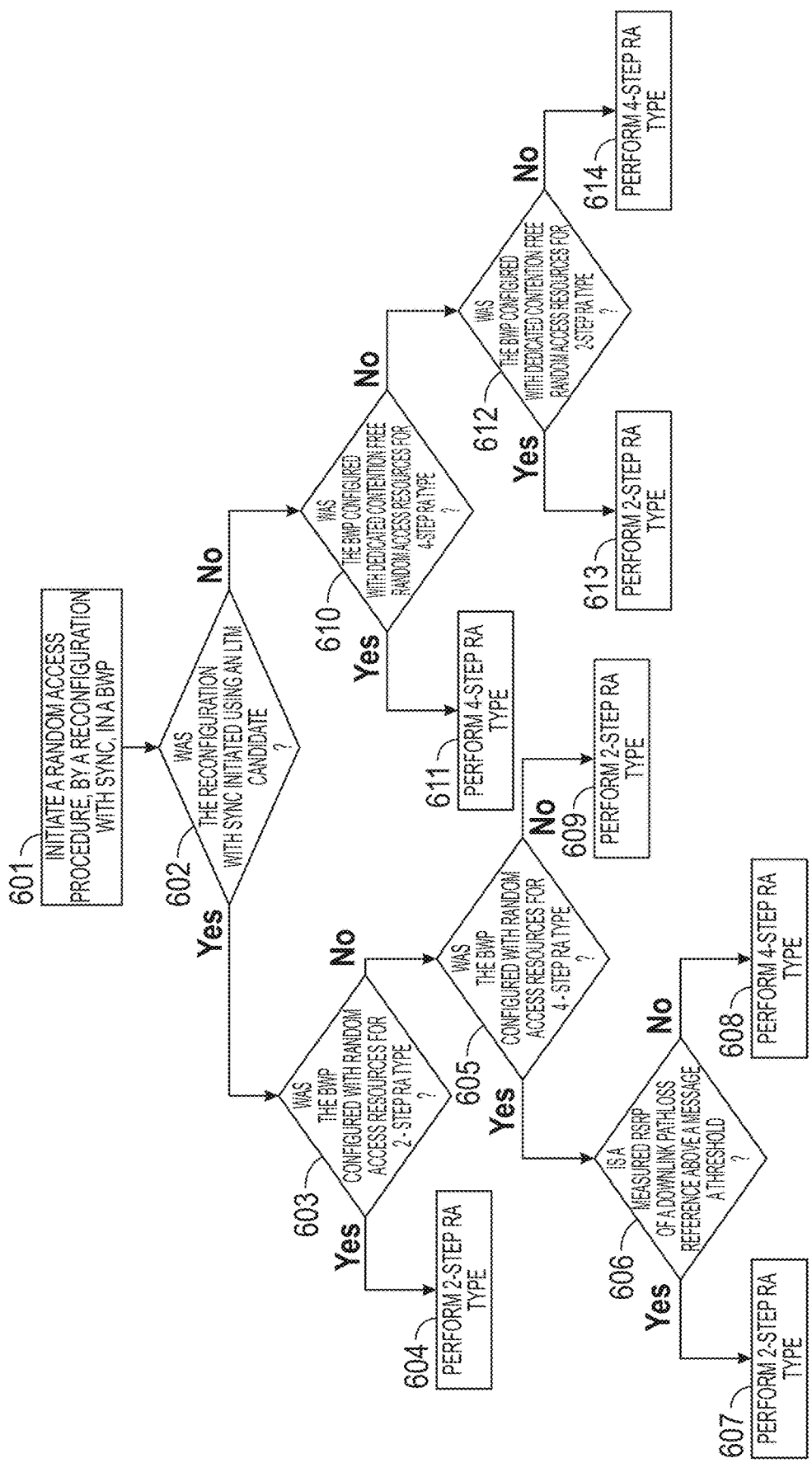
FIGS. 6-10 are flow diagram illustrating activities associated with a random access procedure according to at least one example embodiment.

FIG. 6 is a flow diagram illustrating activities associated with a random access procedure according to at least one example embodiment. In at least one example embodiment, there is a set of operations that corresponds with the activities of FIG. 6. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 6.

At block 601, the apparatus initiates an RA procedure, by a reconfiguration with sync, for a BWP.

At block 602, the apparatus determines whether or not the reconfiguration with sync was initiated for recovery using an LTM candidate. In circumstances where the reconfiguration with sync was not initiated for recovery using an LTM candidate configuration, flow proceeds to block 610. In circumstances where the reconfiguration with sync was initiated for recovery using an LTM candidate configuration, flow proceeds to block 603.

At block 603, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 604. In circumstances where the BWP is not configured with RA resources for 2-step RA type, flow proceeds to block 605.

At block 604, the apparatus performs the 2-step RA type. The performance of the 2-step RA type may be similar to that described regarding FIGS. 5A-5B.

At block 605, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 609. In circumstances where the BWP is configured with RA resources for 4-step RA type, flow proceeds to block 606.

At block 606, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 607. In circumstances where the measured RSRP of the downlink pathloss reference is not above the message-A threshold, flow proceeds to block 608.

At block 607, the apparatus performs the 2-step RA type. The performance of the 2-step RA type may be similar to that described regarding FIGS. 5A-5B.

At block 608, the apparatus performs the 4-step RA type. The performance of the 4-step RA type may be similar to that described regarding FIGS. 5A-5B.

At block 609, the apparatus performs the 2-step RA type. The performance of the 2-step RA type may be similar to that described regarding FIGS. 5A-5B.

At block 610, the apparatus determines whether or not the BWP was configured with dedicated contention free RA resources for a 4-step RA type. In circumstances where the BWP was configured with the dedicated contention free RA resources for the 4-step RA type, flow proceeds to block 611. In circumstances where the active BWP was not configured with the dedicated contention free RA resources for the 4-step RA type, flow proceeds to block 612.

At block 611, the apparatus performs the 4-step RA type. The performance of the 4-step RA type may be similar to that described regarding FIGS. 5A-5B.

At block 612, the apparatus determines whether or not the BWP was configured with dedicated contention free RA resources for a 2-step RA type. In circumstances where the BWP was configured with the dedicated contention free RA resources for the 2-step RA type, flow proceeds to block 613. In circumstances where the BWP was not configured with the dedicated contention free RA resources for the 2-step RA type, flow proceeds to block 614.

At block 613, the apparatus performs the 2-step RA type. The performance of the 2-step RA type may be similar to that described regarding FIGS. 5A-5B.

At block 614, the apparatus performs the 4-step RA type. The performance of the 4-step RA type may be similar to that described regarding FIGS. 5A-5B.

Figure 7:
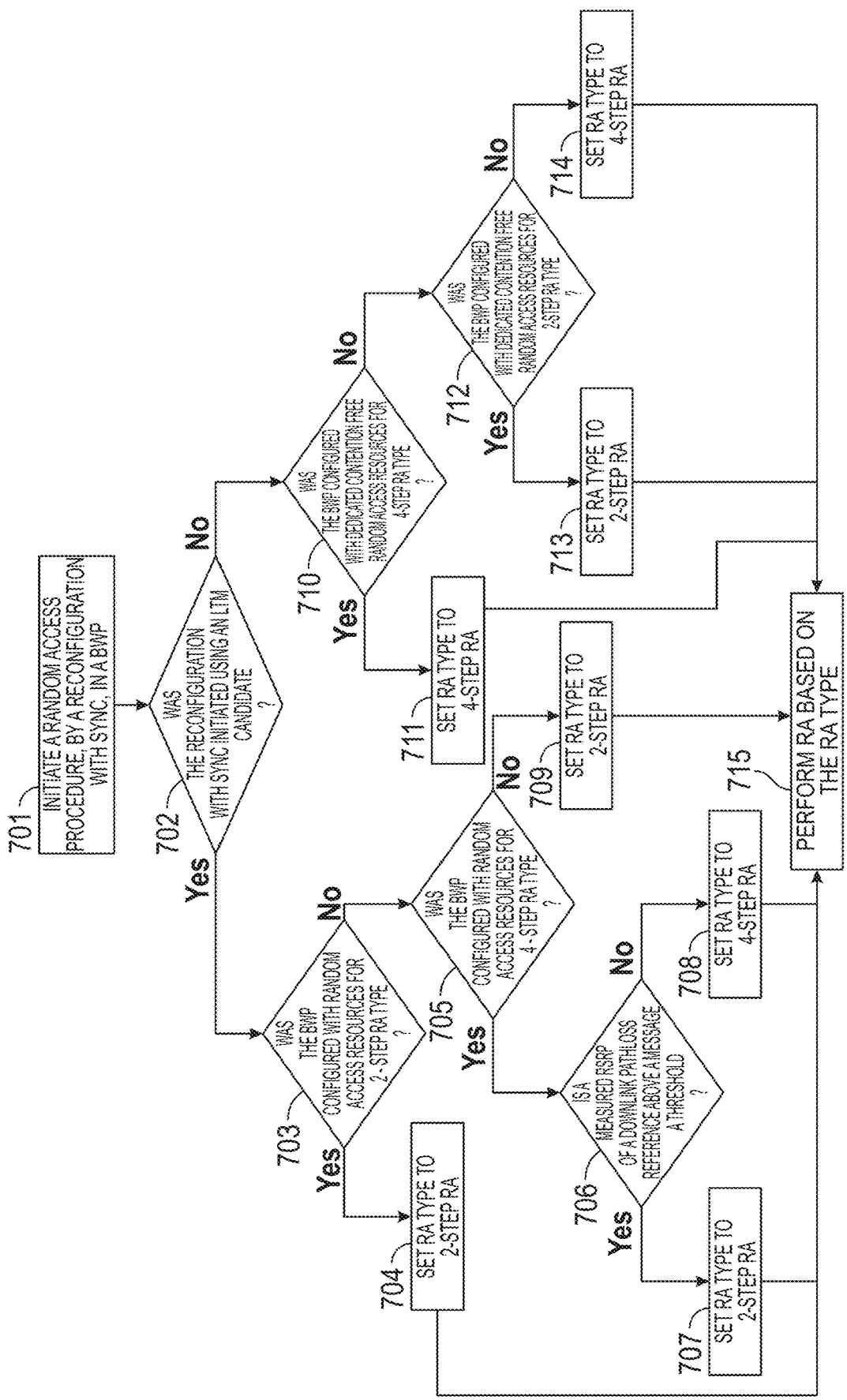

FIG. 7 is a flow diagram illustrating activities associated with a random access procedure according to at least one example embodiment. In at least one example embodiment, there is a set of operations that corresponds with the activities of FIG. 7. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 7.

At block 701, the apparatus initiates an RA procedure, by a reconfiguration with sync, for a BWP.

At block 702, the apparatus determines whether or not the reconfiguration with sync was initiated for recovery using an LTM candidate. In circumstances where the reconfiguration with sync was not initiated for recovery using an LTM candidate configuration, flow proceeds to block 710. In circumstances where the reconfiguration with sync was initiated for recovery using an LTM candidate configuration, flow proceeds to block 703.

At block 703, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 704. In circumstances where the BWP is not configured with RA resources for 2-step RA type, flow proceeds to block 705.

At block 704, the apparatus performs setting the RA type to 2-step RA type similar to that described regarding FIG. 5A.

At block 705, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 709. In circumstances where the BWP is configured with RA resources for 4-step RA type, flow proceeds to block 706.

At block 706, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 707. In circumstances where the measured RSRP of the downlink pathloss reference is not above the message-A threshold, flow proceeds to block 708.

At block 707, the apparatus performs setting the RA type to 2-step RA type similar to that described regarding FIG. 5A.

At block 708, the apparatus performs setting the RA type to 4-step RA type similar to that described regarding FIG. 5A.

At block 709, the apparatus performs setting the RA type to 2-step RA type similar to that described regarding FIG. 5A.

At block 710, the apparatus determines whether or not the BWP was configured with dedicated contention free RA resources for a 4-step RA type. In circumstances where the BWP was configured with the dedicated contention free RA resources for the 4-step RA type, flow proceeds to block 711. In circumstances where the active BWP was not configured with the dedicated contention free RA resources for the 4-step RA type, flow proceeds to block 712.

At block 711, the apparatus performs setting the RA type to 4-step RA type similar to that described regarding FIG. 5A.

At block 712, the apparatus determines whether or not the BWP was configured with dedicated contention free RA resources for a 2-step RA type. In circumstances where the BWP was configured with the dedicated contention free RA resources for the 2-step RA type, flow proceeds to block 713. In circumstances where the BWP was not configured with the dedicated contention free RA resources for the 2-step RA type, flow proceeds to block 714.

At block 713, the apparatus performs setting the RA type to 2-step RA type similar to that described regarding FIG. 5A.

At block 714, the apparatus performs setting the RA type to 4-step RA type similar to that described regarding FIG. 5A.

At block 715, the apparatus performs the RA procedure based on the set RA type, similar to that described regarding FIG. 5A.

In some circumstances, it may be desirable for the base station to direct the UE to perform synchronization by way of a quick RA procedure. For example, it may be desirable for the UE to quickly synchronize with another cell. In such circumstances, an RA procedure may be initiated by a PDCCH order from the base station. In at least one example embodiment, a PDCCH order refers to a PDCCH transmission that is configured to cause the UE to perform an RA procedure as specified by the PDCCH transmission. In at least one example embodiment, the PDCCH order indicates RA resources to be used for the RA procedure. In at least one example embodiment, the PDCCH order is a downlink control information (DCI). In at least one example embodiment, the DCI is a DCI format 1_0. In at least one example embodiment, the DCI is scrambled by a cell radio network temporary identifier (C-RNTI). In at least one example embodiment, the DCI comprises a frequency domain resource assignment field. In at least one example embodiment, the scrambling of the DCI by the C-RNTI and the frequency domain assignment field having each bit set to the value of 1 signifies that the DCI is initiating the RA procedure by the PDCCH order. For example, when the UE receives a DCI scrambled by the C-RNTI, the UE may determine that the DCI is initiating the RA procedure by PDCCH order in circumstances where the frequency domain assignment field having each bit set to the value of 1.

In at least one example embodiment, the DCI comprises a cell indicator field. In at least one example embodiment, the cell indicator field indicates a cell for performing the RA procedure. In at least one example embodiment, the UE selects a set of RA resources configured that corresponds to a cell indicated by the cell indicator field. In at least one example embodiment, the UE selects a set of RA resources configured in an early uplink sync configuration that corresponds to a cell indicated by the cell indicator field. In at least one example embodiment, the early uplink sync configuration is an information element that designates sets of RA resources to be used for a low latency synchronization. Due to the fact that the PDCCH order is intended for quick UE synchronization, it may be desirable to utilize a 4-step RA type procedure to avoid possible delays due to reliability issues associated with a 2-step RA type procedure. In at least one example embodiment, the UE performs a 4-step RA procedure in response to receiving the PDCCH order.

Figure 8:
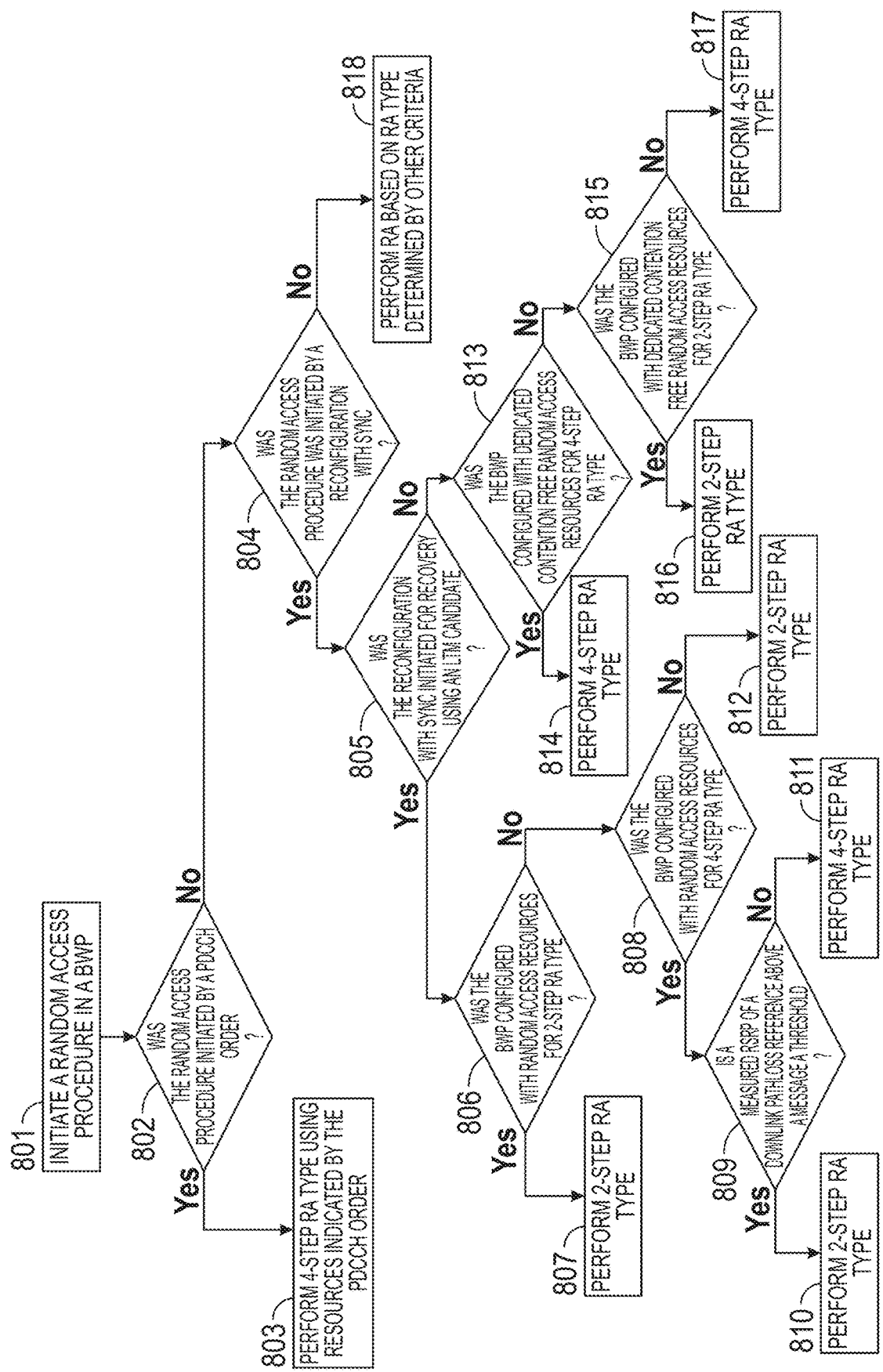

FIG. 8 is a flow diagram illustrating activities associated with a random access procedure according to at least one example embodiment. In at least one example embodiment, there is a set of operations that corresponds with the activities of FIG. 8. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 8.

At block 801, the apparatus initiates an RA procedure, by a reconfiguration with sync, for a BWP.

At block 802, the apparatus determines whether or not the RA procedure was initiated by a PDCCH order. In circumstances where the RA procedure was initiated by a PDCCH order, flow proceeds to block 803. In circumstances where the RA procedure was not initiated by a PDCCH order, flow proceeds to block 804.

At block 803, the apparatus performs 4-step RA using RA resources indicated by the PDCCH order. In at least one example embodiment, the UE selects a set of RA resources configured in an early uplink sync configuration that corresponds to a cell indicated by the cell indicator field and performs 4-step RA using the selected RA resources.

At block 804, the apparatus determines whether or not the RA procedure was initiated by a reconfiguration with sync. In circumstances where the UE determines that the RA procedure was initiated by a reconfiguration with sync, flow proceeds to block 805. In circumstances where the UE determines that the RA procedure was not initiated by a reconfiguration with sync, flow proceeds to block 818.

At block 805, the apparatus determines whether or not the reconfiguration with sync was initiated for recovery using an LTM candidate. In circumstances where the reconfiguration with sync was not initiated for recovery using an LTM candidate configuration, flow proceeds to block 813. In circumstances where the reconfiguration with sync was initiated for recovery using an LTM candidate configuration, flow proceeds to block 806.

At block 806, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 807. In circumstances where the BWP is not configured with RA resources for 2-step RA type, flow proceeds to block 808.

At block 807, the apparatus performs the 2-step RA type. The performance of the 2-step RA type may be similar to that described regarding FIGS. 5A-5B.

At block 808, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 812. In circumstances where the BWP is configured with RA resources for 4-step RA type, flow proceeds to block 809.

At block 809, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 810. In circumstances where the measured RSRP of the downlink pathloss reference is not above the message-A threshold, flow proceeds to block 811.

At block 810, the apparatus performs the 2-step RA type. The performance of the 2-step RA type may be similar to that described regarding FIGS. 5A-5B.

At block 811, the apparatus performs the 4-step RA type. The performance of the 4-step RA type may be similar to that described regarding FIGS. 5A-5B.

At block 812, the apparatus performs the 2-step RA type. The performance of the 2-step RA type may be similar to that described regarding FIGS. 5A-5B.

At block 813, the apparatus determines whether or not the BWP was configured with dedicated contention free RA resources for a 4-step RA type. In circumstances where the BWP was configured with the dedicated contention free RA resources for the 4-step RA type, flow proceeds to block 814. In circumstances where the active BWP was not configured with the dedicated contention free RA resources for the 4-step RA type, flow proceeds to block 815.

At block 814, the apparatus performs the 4-step RA type. The performance of the 4-step RA type may be similar to that described regarding FIGS. 5A-5B.

At block 815, the apparatus determines whether or not the BWP was configured with dedicated contention free RA resources for a 2-step RA type. In circumstances where the BWP was configured with the dedicated contention free RA resources for the 2-step RA type, flow proceeds to block 816. In circumstances where the BWP was not configured with the dedicated contention free RA resources for the 2-step RA type, flow proceeds to block 817.

At block 816, the apparatus performs the 2-step RA type. The performance of the 2-step RA type may be similar to that described regarding FIGS. 5A-5B.

At block 817, the apparatus performs the 4-step RA type. The performance of the 4-step RA type may be similar to that described regarding FIGS. 5A-5B.

At block 818, the apparatus performs RA based on an RA type determined by other criteria. For example, the apparatus may determine RA type based on a criteria other than the criteria discussed regarding FIG. 8.

As previously discussed, LTM enables reconfiguration using lower layer signaling, while keeping configuration of the upper layers. In order to avoid higher layer signaling, it may be desirable for the base station to invoke an RA procedure for LTM by way of an LTM cell switch medium access control (MAC) control element (CE). In at least one example embodiment, the LTM cell switch MAC CE is a CE that instructs the UE to perform an LTM cell switch. In at least one example embodiment, the LTM cell switch involves the UE performing an RA procedure. Due to the fact that the LTM cell switch MAC CE is intended for quick UE synchronization, it may be desirable to utilize a 4-step RA type procedure to avoid possible delays due to reliability issues associated with a 2-step RA type procedure. However, the LTM cell switch MAC CE may or may not indicate contention free resources for use in the associated RA procedure. In at least one example embodiment, in circumstances where the LTM cell switch MAC CE indicates contention free random access resources, the UE performs 4-step RA using the contention free resources indicated by the LTM cell switch MAC CE. However, in circumstances where the LTM cell switch MAC CE does not indicate contention free random access resources, the UE determines the RA type based on RA resource configuration information outside of the LTM cell switch MAC CE.

Figure 9:
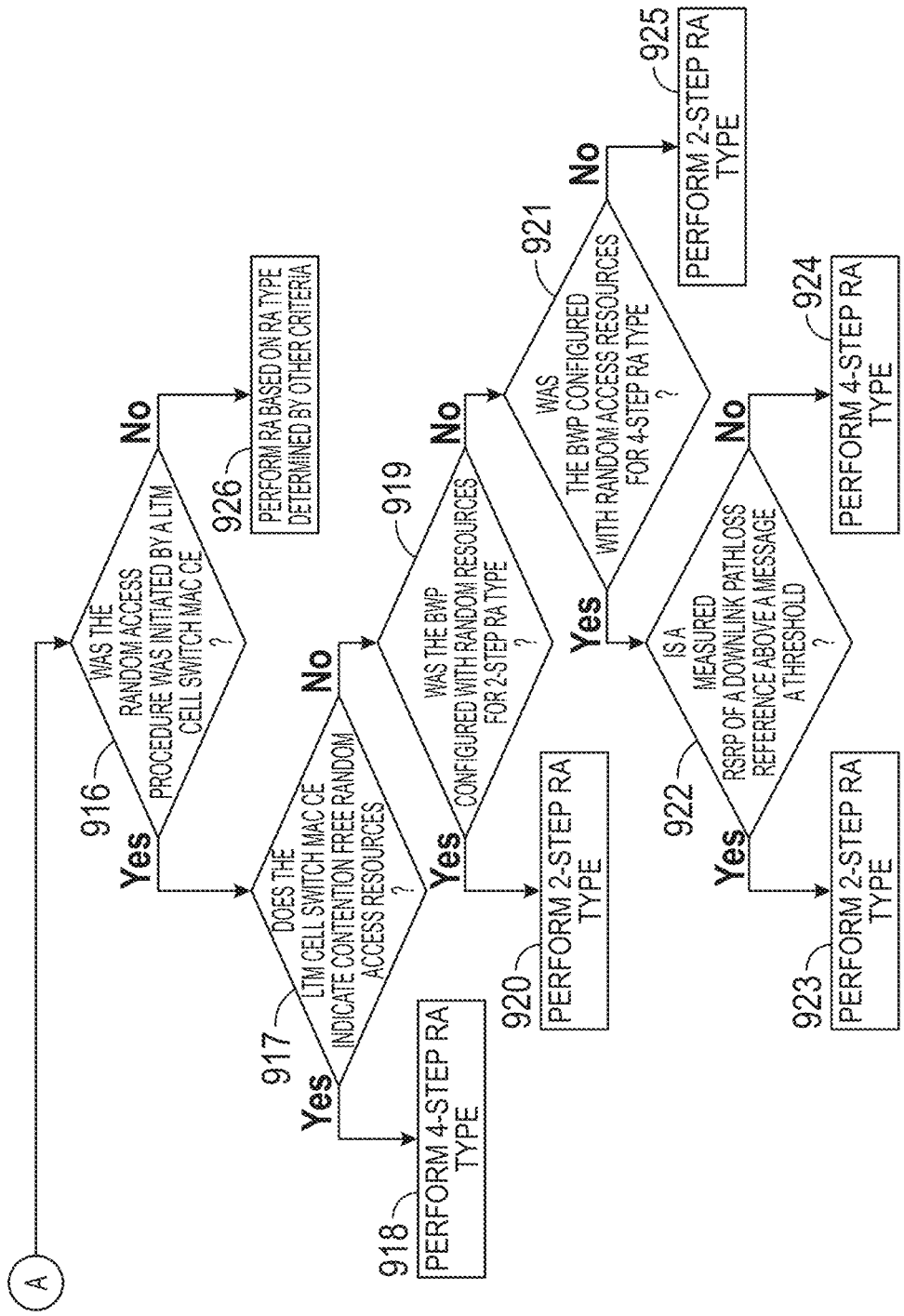
Figure 9:
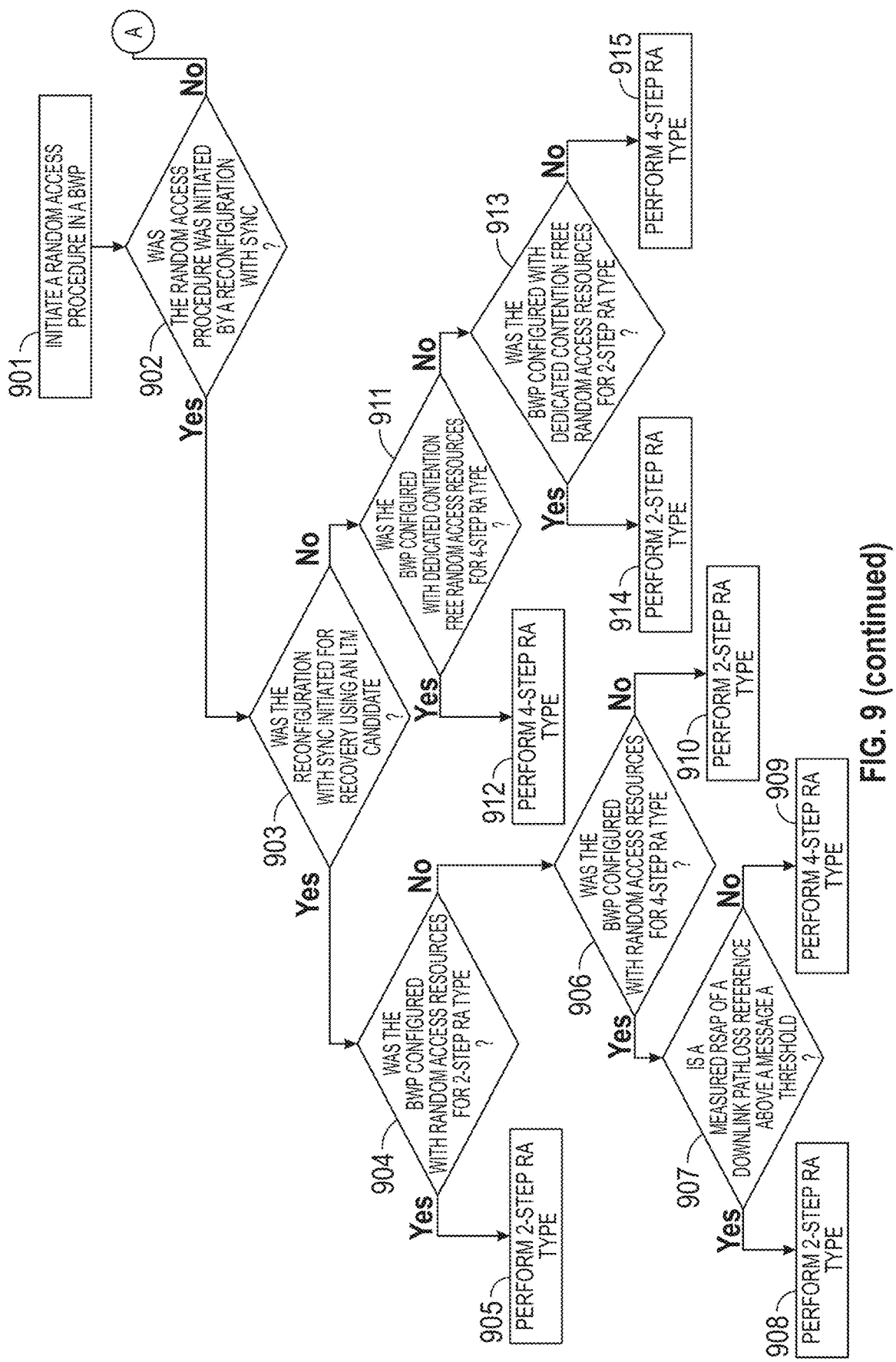

FIG. 9 is a flow diagram illustrating activities associated with a random access procedure according to at least one example embodiment. In at least one example embodiment, there is a set of operations that corresponds with the activities of FIG. 9. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 9.

At block 901, the apparatus initiates an RA procedure for a BWP.

At block 902, the apparatus determines whether or not the RA procedure was initiated by a reconfiguration with sync. In circumstances where the UE determines that the RA procedure was initiated by a reconfiguration with sync, flow proceeds to block 903. In circumstances where the UE determines that the RA procedure was not initiated by a reconfiguration with sync, flow proceeds to block 916.

At block 903, the apparatus determines whether or not the reconfiguration with sync was initiated for recovery using an LTM candidate. In circumstances where the reconfiguration with sync was not initiated for recovery using an LTM candidate configuration, flow proceeds to block 915. In circumstances where the reconfiguration with sync was initiated for recovery using an LTM candidate configuration, flow proceeds to block 904.

At block 904, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 905. In circumstances where the BWP is not configured with RA resources for 2-step RA type, flow proceeds to block 906.

At block 905, the apparatus performs the 2-step RA type. The performance of the 2-step RA type may be similar to that described regarding FIGS. 5A-5B.

At block 906, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 910. In circumstances where the BWP is configured with RA resources for 4-step RA type, flow proceeds to block 907.

At block 907, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 908. In circumstances where the measured RSRP of the downlink pathloss reference is not above the message-A threshold, flow proceeds to block 909.

At block 908, the apparatus performs the 2-step RA type. The performance of the 2-step RA type may be similar to that described regarding FIGS. 5A-5B.

At block 909, the apparatus performs the 4-step RA type. The performance of the 4-step RA type may be similar to that described regarding FIGS. 5A-5B.

At block 910, the apparatus performs the 2-step RA type. The performance of the 2-step RA type may be similar to that described regarding FIGS. 5A-5B.

At block 911, the apparatus determines whether or not the BWP was configured with dedicated contention free RA resources for a 4-step RA type. In circumstances where the BWP was configured with the dedicated contention free RA resources for the 4-step RA type, flow proceeds to block 912. In circumstances where the active BWP was not configured with the dedicated contention free RA resources for the 4-step RA type, flow proceeds to block 913.

At block 912, the apparatus performs the 4-step RA type. The performance of the 4-step RA type may be similar to that described regarding FIGS. 5A-5B.

At block 913, the apparatus determines whether or not the BWP was configured with dedicated contention free RA resources for a 2-step RA type. In circumstances where the BWP was configured with the dedicated contention free RA resources for the 2-step RA type, flow proceeds to block 914. In circumstances where the BWP was not configured with the dedicated contention free RA resources for the 2-step RA type, flow proceeds to block 915.

At block 914, the apparatus performs the 2-step RA type. The performance of the 2-step RA type may be similar to that described regarding FIGS. 5A-5B.

At block 915, the apparatus performs the 4-step RA type. The performance of the 4-step RA type may be similar to that described regarding FIGS. 5A-5B.

At block 916, the apparatus determines whether or not the RA procedure was initiated by an LTM cell switch medium access control (MAC) control element (CE). If the apparatus determines that the RA procedure was initiated by an LTM cell switch medium access control (MAC) control element (CE), flow proceeds to block 917. If the apparatus determines that the RA procedure was not initiated by an LTM cell switch medium access control (MAC) control element (CE), flow proceeds to block 926.

At block 917, the apparatus determines whether or not the LTM cell switch MAC CE indicates contention free random access resources. In circumstances where the LTM cell switch MAC CE indicates contention free random access resources, flow proceeds to block 918. In circumstances where the LTM cell switch MAC CE does not indicate contention free random access resources, flow proceeds to block 919.

At block 918, the apparatus performs 4-step RA using the contention free resources indicated by the LTM cell switch MAC CE.

At block 919, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 920. In circumstances where the BWP is not configured with RA resources for 2-step RA type, flow proceeds to block 921.

At block 920, the apparatus performs the 2-step RA type. The performance of the 2-step RA type may be similar to that described regarding FIGS. 5A-5B.

At block 921, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 925. In circumstances where the BWP is configured with RA resources for 4-step RA type, flow proceeds to block 922.

At block 922, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 923. In circumstances where the measured RSRP of the downlink pathloss reference is not above the message-A threshold, flow proceeds to block 924.

At block 923, the apparatus performs the 2-step RA type. The performance of the 2-step RA type may be similar to that described regarding FIGS. 5A-5B.

At block 924, the apparatus performs the 4-step RA type. The performance of the 4-step RA type may be similar to that described regarding FIGS. 5A-5B.

At block 925, the apparatus performs the 2-step RA type. The performance of the 2-step RA type may be similar to that described regarding FIGS. 5A-5B.

At block 926, the apparatus performs RA based on an RA type determined by other criteria. For example, the apparatus may determine RA type based on a criteria other than the criteria discussed regarding FIG. 9.

Figure 10:
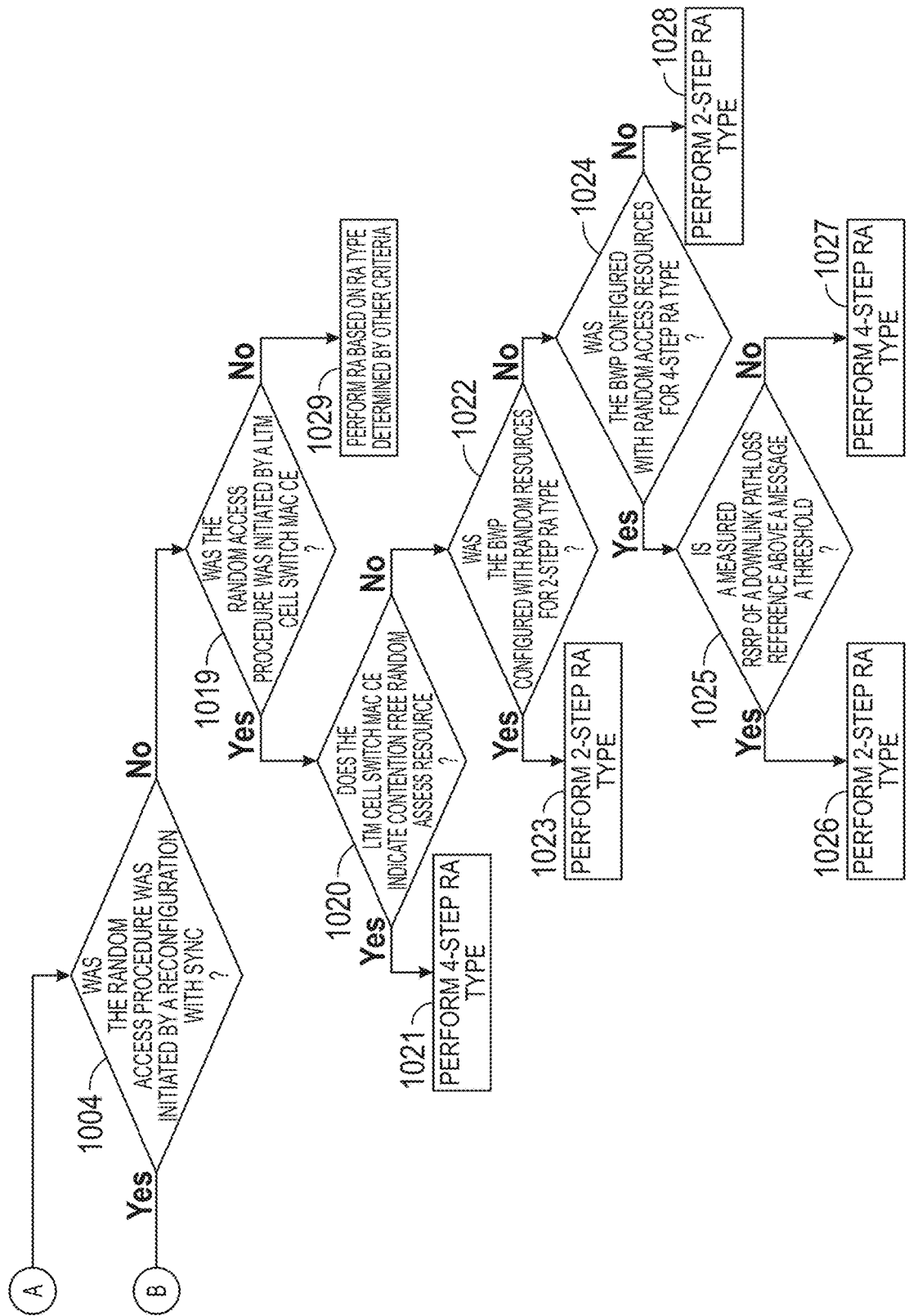
Figure 10:
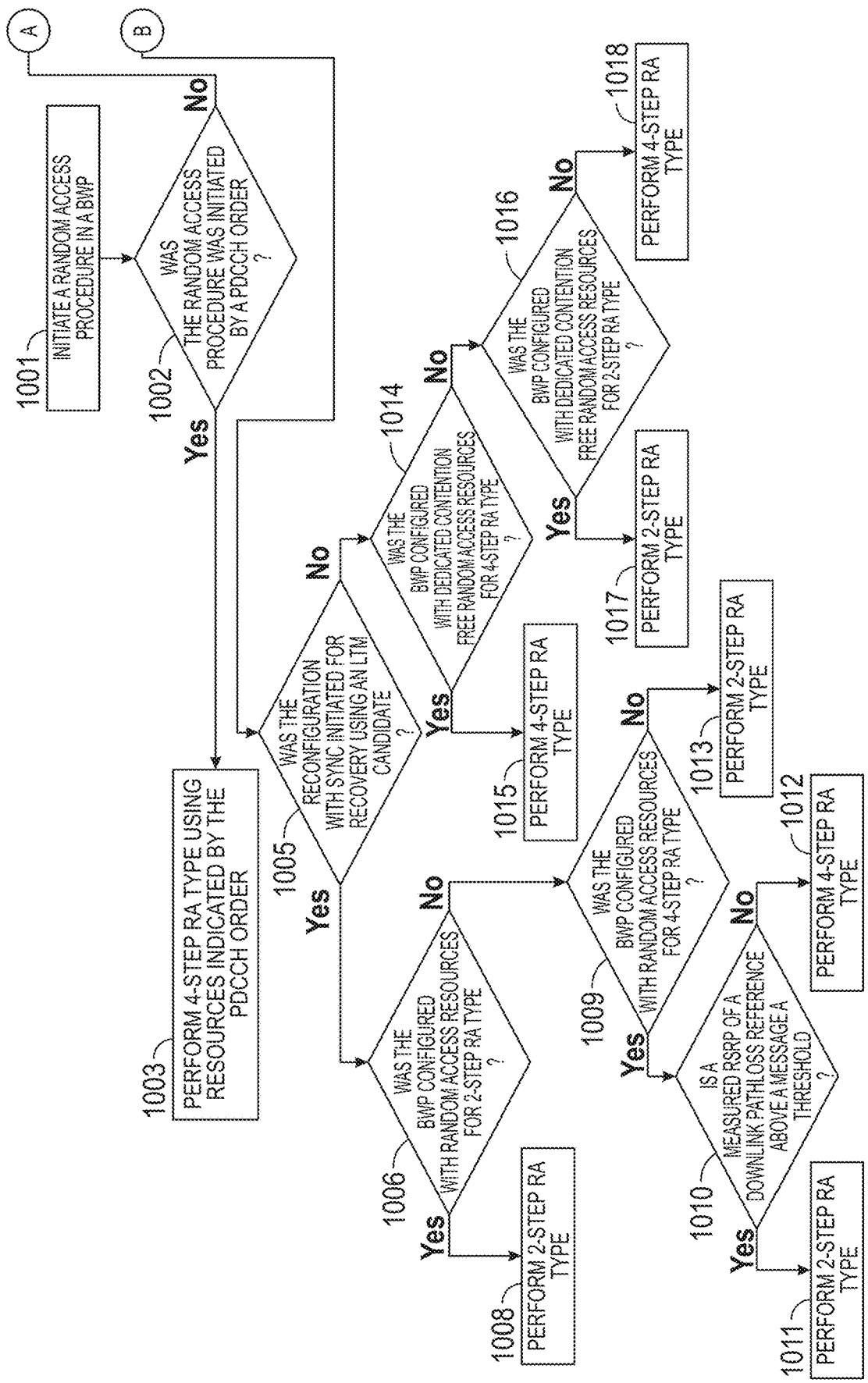

FIG. 10 is a flow diagram illustrating activities associated with a random access procedure according to at least one example embodiment. In at least one example embodiment, there is a set of operations that corresponds with the activities of FIG. 10. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 10.

At block 1001, the apparatus initiates an RA procedure, by a reconfiguration with sync, for a BWP.

At block 1002, the apparatus determines whether or not the RA procedure was initiated by a PDCCH order. In circumstances where the RA procedure was initiated by a PDCCH order, flow proceeds to block 1003. In circumstances where the RA procedure was not initiated by a PDCCH order, flow proceeds to block 1004.

At block 1003, the apparatus performs 4-step RA using RA resources indicated by the PDCCH order. In at least one example embodiment, the UE selects a set of RA resources configured in an early uplink sync configuration that corresponds to a cell indicated by the cell indicator field and performs 4-step RA using the selected RA resources.

At block 1004, the apparatus determines whether or not the RA procedure was initiated by a reconfiguration with sync. In circumstances where the UE determines that the RA procedure was initiated by a reconfiguration with sync, flow proceeds to block 1005. In circumstances where the UE determines that the RA procedure was not initiated by a reconfiguration with sync, flow proceeds to block 1019.

At block 1005, the apparatus determines whether or not the reconfiguration with sync was initiated for recovery using an LTM candidate. In circumstances where the reconfiguration with sync was not initiated for recovery using an LTM candidate configuration, flow proceeds to block 1014. In circumstances where the reconfiguration with sync was initiated for recovery using an LTM candidate configuration, flow proceeds to block 1006.

At block 1006, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 1008. In circumstances where the BWP is not configured with RA resources for 2-step RA type, flow proceeds to block 1009.

At block 1008, the apparatus performs the 2-step RA type. The performance of the 2-step RA type may be similar to that described regarding FIGS. 5A-5B.

At block 1009, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 1013. In circumstances where the BWP is configured with RA resources for 4-step RA type, flow proceeds to block 1010.

At block 1010, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 1011. In circumstances where the measured RSRP of the downlink pathloss reference is not above the message-A threshold, flow proceeds to block 1012.

At block 1011, the apparatus performs the 2-step RA type. The performance of the 2-step RA type may be similar to that described regarding FIGS. 5A-5B.

At block 1012, the apparatus performs the 4-step RA type. The performance of the 4-step RA type may be similar to that described regarding FIGS. 5A-5B.

At block 1013, the apparatus performs the 2-step RA type. The performance of the 2-step RA type may be similar to that described regarding FIGS. 5A-5B.

At block 1014, the apparatus determines whether or not the BWP was configured with dedicated contention free RA resources for a 4-step RA type. In circumstances where the BWP was configured with the dedicated contention free RA resources for the 4-step RA type, flow proceeds to block 1015. In circumstances where the active BWP was not configured with the dedicated contention free RA resources for the 4-step RA type, flow proceeds to block 1016.

At block 1015, the apparatus performs the 4-step RA type. The performance of the 4-step RA type may be similar to that described regarding FIGS. 5A-5B.

At block 1016, the apparatus determines whether or not the BWP was configured with dedicated contention free RA resources for a 2-step RA type. In circumstances where the BWP was configured with the dedicated contention free RA resources for the 2-step RA type, flow proceeds to block 1017. In circumstances where the BWP was not configured with the dedicated contention free RA resources for the 2-step RA type, flow proceeds to block 1018.

At block 1017, the apparatus performs the 2-step RA type. The performance of the 2-step RA type may be similar to that described regarding FIGS. 5A-5B.

At block 1018, the apparatus performs the 4-step RA type. The performance of the 4-step RA type may be similar to that described regarding FIGS. 5A-5B.

At block 1019, the apparatus determines whether or not the RA procedure was initiated by an LTM cell switch medium access control (MAC) control element (CE). If the apparatus determines that the RA procedure was initiated by an LTM cell switch medium access control (MAC) control element (CE), flow proceeds to block 1020. If the apparatus determines that the RA procedure was not initiated by an LTM cell switch medium access control (MAC) control element (CE), flow proceeds to block 1029.

At block 1020, the apparatus determines whether or not the LTM cell switch MAC CE indicates contention free random access resources. In circumstances where the LTM cell switch MAC CE indicates contention free random access resources, flow proceeds to block 1021. In circumstances where the LTM cell switch MAC CE does not indicate contention free random access resources, flow proceeds to block 1022.

At block 1021, the apparatus performs 4-step RA using the contention free resources indicated by the LTM cell switch MAC CE.

At block 1022, the apparatus determines whether or not the BWP is configured with RA resources for 2-step RA type. In at least one example embodiment, determining whether or not the BWP is configured with RA resources for the 2-step RA type comprises determining whether or not the BWP is configured with common RA resources for 2-step RA type. In circumstances where the BWP is configured with RA resources for 2-step RA type, flow proceeds to block 1023. In circumstances where the BWP is not configured with RA resources for 2-step RA type, flow proceeds to block 1024.

At block 1023, the apparatus performs the 2-step RA type. The performance of the 2-step RA type may be similar to that described regarding FIGS. 5A-5B.

At block 1024, the apparatus determines whether or not the BWP is configured with RA resources for 4-step RA type. In at least one example embodiment, determining whether or not the BWP is configured with RA resources for the 4-step RA type comprises determining whether or not the BWP is configured with common RA resources for 4-step RA type. In circumstances where the BWP is not configured with RA resources for 4-step RA type random access, flow proceeds to block 1028. In circumstances where the BWP is configured with RA resources for 4-step RA type, flow proceeds to block 1025.

At block 1025, the apparatus determines whether or not a measured reference signal received power (RSRP) of a downlink pathloss reference is above a message-A threshold. In circumstances where the measured RSRP of the downlink pathloss reference is above the message-A threshold, flow proceeds to block 1026. In circumstances where the measured RSRP of the downlink pathloss reference is not above the message-A threshold, flow proceeds to block 1027.

At block 1026, the apparatus performs the 2-step RA type. The performance of the 2-step RA type may be similar to that described regarding FIGS. 5A-5B.

At block 1027, the apparatus performs the 4-step RA type. The performance of the 4-step RA type may be similar to that described regarding FIGS. 5A-5B.

At block 1028, the apparatus performs the 2-step RA type. The performance of the 2-step RA type may be similar to that described regarding FIGS. 5A-5B.

At block 1029, the apparatus performs RA based on an RA type determined by other criteria. For example, the apparatus may determine RA type based on a criteria other than the criteria discussed regarding FIG. 10.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method performed by a UE, the method comprising:
   initiating a random access (RA) procedure for a bandwidth part (BWP);
   determining whether or not the RA procedure was initiated by a reconfiguration with sync;
   in circumstances where the RA procedure was initiated by the reconfiguration with sync:
   determining whether or not the reconfiguration with sync was initiated for recovery using a lower-layer triggered mobility (LTM) candidate configuration;
   in circumstances where the reconfiguration with sync was not initiated for recovery using an LTM candidate configuration:
   determining whether or not the BWP was configured with dedicated contention free RA resources for a 4-step RA type;

in circumstances where the BWP was configured with the dedicated contention free RA resources for the 4-step RA type, performing 4-step RA;

in circumstances where the BWP was not configured with the dedicated contention free RA resources for the 4-step RA type:

determining whether or not the BWP was configured with dedicated contention free RA resources for a 2-step RA type;

in circumstances where the BWP was configured with the dedicated contention free RA resources for the 2-step RA type, performing 2-step RA;

in circumstances where the BWP was not configured with the dedicated contention free RA resources for the 2-step RA type, performing 4-step RA; and in circumstances where the reconfiguration with sync was initiated for recovery using an LTM candidate configuration:

determining that the BWP is configured with RA resources for 2-step RA type;

determining whether or not the BWP is configured with RA resources for 4-step RA type;

in circumstances where the BWP is not configured with RA resources for 4-step RA type random access, performing 2-step RA;

in circumstances where the BWP is configured with RA resources for 4-step RA type:

determining whether or not a measured reference signal received power (RSRP) of a downlink pathloss reference is above a message-A threshold;

in circumstances where the measured RSRP of the downlink pathloss reference is above the message-A threshold, performing 2-step RA; and in circumstances where the measured RSRP of the downlink pathloss reference is not above the message-A threshold, performing 4-step RA; and in circumstances where the RA procedure was not initiated by the reconfiguration with sync:

determining that an LTM cell switch medium access control (MAC) control element (CE) indicates contention free random access resources; and performing 4-step RA.

2. The method of claim 1, wherein the dedicated contention free RA resources are received in a rach-configDedicated information element.

3. The method of claim 1, wherein determining whether or not the BWP is configured with RA resources for the 2-step RA type comprises determining whether or not the BWP is configured with common RA resources for 2-step RA type.

4. The method of claim 1, wherein determining whether or not the BWP is configured with RA resources for the 4-step RA type comprises determining whether or not the BWP is configured with common RA resources for 4-step RA type.

5. The method of claim 1, wherein the circumstances where the reconfiguration with sync was initiated for recovery using an LTM candidate configuration include circumstances where a prior reconfiguration with sync failed and the UE is configured with a stored conditional RRC reconfiguration associated with the LTM candidate configuration.

6. The method of claim 1, wherein performing 2-step RA comprises setting an RA type to be performed to 2-step RA type and performing the RA procedure based on the set RA type to be performed and wherein performing 4-step RA comprises setting the RA type to be performed to 4-step RA type and performing the RA procedure based on the set RA type to be performed.

7. The method of claim 1, wherein performing 2-step RA comprises selecting a RA resource set and performing the RA procedure based on the RA type designated by the selected RA resource set and wherein performing 4-step RA comprises selecting a different RA resource set and performing the RA procedure based on the RA type designated by the selected different RA resource set.

8. A UE comprising:

at least one processor, and at least one memory, the memory comprising machine-readable instructions, that when executed by the processor cause the UE to perform:

initiating a random access (RA) procedure for a bandwidth part (BWP);

determining whether or not the RA procedure was initiated by a reconfiguration with sync;

in circumstances where the RA procedure was initiated by the reconfiguration with sync:

determining whether or not the reconfiguration with sync was initiated for recovery using a lower-layer triggered mobility (LTM) candidate configuration;

in circumstances where the reconfiguration with sync was not initiated for recovery using an LTM candidate configuration:

determining whether or not the BWP was configured with dedicated contention free RA resources for a 4-step RA type;

in circumstances where the BWP was configured with the dedicated contention free RA resources for the 4-step RA type, performing 4-step RA;

in circumstances where the BWP was not configured with the dedicated contention free RA resources for the 4-step RA type:

determining whether or not the BWP was configured with dedicated contention free RA resources for a 2-step RA type;

in circumstances where the BWP was configured with the dedicated contention free RA resources for the 2-step RA type, performing 2-step RA;

in circumstances where the BWP was not configured with the dedicated contention free RA resources for the 2-step RA type, performing 4-step RA; and in circumstances where the reconfiguration with sync was initiated for recovery using an LTM candidate configuration:

determining that the BWP is configured with RA resources for 2-step RA type;

determining whether or not the BWP is configured with RA resources for 4-step RA type;

in circumstances where the BWP is not configured with RA resources for 4-step RA type random access, performing 2-step RA;

in circumstances where the BWP is configured with RA resources for 4-step RA type:

determining whether or not a measured reference signal received power (RSRP) of a downlink pathloss reference is above a message-A threshold;

in circumstances where the measured RSRP of the downlink pathloss reference is above the message-A threshold, performing 2-step RA; and in circumstances where the measured RSRP of the downlink pathloss reference is not above the message-A threshold, performing 4-step RA; and in circumstances where the RA procedure was not initiated by the reconfiguration with sync:
determining that an LTM cell switch medium access control (MAC) control element (CE) indicates contention free random access resources; and
performing 4-step RA.

9. The UE of claim 8, wherein the dedicated contention free RA resources are received in a rach-configDedicated information element.

10. The UE of claim 8, wherein determining whether or not the BWP is configured with RA resources for the 2-step RA type comprises determining whether or not the BWP is configured with common RA resources for 2-step RA type.

11. The UE of claim 8, wherein determining whether or not the BWP is configured with RA resources for the 4-step RA type comprises determining whether or not the BWP is configured with common RA resources for 4-step RA type.

12. The UE of claim 8, wherein the circumstances where the reconfiguration with sync was initiated for recovery using an LTM candidate configuration include circumstances where a prior reconfiguration with sync failed and the UE is configured with a stored conditional RRC reconfiguration associated with the LTM candidate configuration.

13. The UE of claim 8, wherein performing 2-step RA comprises setting an RA type to be performed to 2-step RA type and performing the RA procedure based on the set RA type to be performed and wherein performing 4-step RA comprises setting the RA type to be performed to 4-step RA type and performing the RA procedure based on the set RA type to be performed.

14. The UE of claim 8, wherein performing 2-step RA comprises selecting a RA resource set and performing the RA procedure based on the RA type designated by the selected RA resource set and wherein performing 4-step RA comprises selecting a different RA resource set and performing the RA procedure based on the RA type designated by the selected different RA resource set.

15. At least one non-transitory computer readable medium comprising instructions that, when executed by a UE, perform:
initiating a random access (RA) procedure for a bandwidth part (BWP);
determining whether or not the RA procedure was initiated by a reconfiguration with sync;
in circumstances where the RA procedure was initiated by the reconfiguration with sync:
determining whether or not the reconfiguration with sync was initiated for recovery using a lower-layer triggered mobility (LTM) candidate configuration;
in circumstances where the reconfiguration with sync was not initiated for recovery using an LTM candidate configuration:
determining whether or not the BWP was configured with dedicated contention free RA resources for a 4-step RA type;
in circumstances where the BWP was configured with the dedicated contention free RA resources for the 4-step RA type, performing 4-step RA;

in circumstances where the BWP was not configured with the dedicated contention free RA resources for the 4-step RA type:
determining whether or not the BWP was configured with dedicated contention free RA resources for a 2-step RA type;
in circumstances where the BWP was configured with the dedicated contention free RA resources for the 2-step RA type, performing 2-step RA;
in circumstances where the BWP was not configured with the dedicated contention free RA resources for the 2-step RA type, performing 4-step RA; and in circumstances where the reconfiguration with sync was initiated for recovery using an LTM candidate configuration:
determining that the BWP is configured with RA resources for 2-step RA type;
determining whether or not the BWP is configured with RA resources for 4-step RA type;
in circumstances where the BWP is not configured with RA resources for 4-step RA type random access, performing 2-step RA;
in circumstances where the BWP is configured with RA resources for 4-step RA type:
determining whether or not a measured reference signal received power (RSRP) of a downlink pathloss reference is above a message-A threshold;
in circumstances where the measured RSRP of the downlink pathloss reference is above the message-A threshold, performing 2-step RA; and
in circumstances where the measured RSRP of the downlink pathloss reference is not above the message-A threshold, performing 4-step RA; and in circumstances where the RA procedure was not initiated by the reconfiguration with sync:
determining that an LTM cell switch medium access control (MAC) control element (CE) indicates contention free random access resources; and
performing 4-step RA.

16. The medium of claim 15, wherein the dedicated contention free RA resources are received in a rach-configDedicated information element.

17. The medium of claim 15, wherein determining whether or not the BWP is configured with RA resources for the 2-step RA type comprises determining whether or not the BWP is configured with common RA resources for 2-step RA type.

18. The medium of claim 15, wherein determining whether or not the BWP is configured with RA resources for the 4-step RA type comprises determining whether or not the BWP is configured with common RA resources for 4-step RA type.

19. The medium of claim 15, wherein the circumstances where the reconfiguration with sync was initiated for recovery using an LTM candidate configuration include circumstances where a prior reconfiguration with sync failed and the UE is configured with a stored conditional RRC reconfiguration associated with the LTM candidate configuration.

20. The medium of claim 15, wherein performing 2-step RA comprises selecting a RA resource set and performing the RA procedure based on the RA type designated by the selected RA resource set and wherein performing 4-step RA comprises selecting a different RA resource set and performing the RA procedure based on the RA type designated by the selected different RA resource set.

* * * * *